United States Patent
Mott et al.

(10) Patent No.: US 10,755,485 B2
(45) Date of Patent: *Aug. 25, 2020

(54) AUGMENTED REALITY PRODUCT PREVIEW

(71) Applicant: A9.com, Inc., Palo Alto, CA (US)

(72) Inventors: David Creighton Mott, Los Altos, CA (US); Arnab Sanat Kumar Dhua, Mountain View, CA (US); Colin Jon Taylor, Orinda, CA (US); Yu Lou, Stanford, CA (US); Chun-Kai Wang, Mountain View, CA (US); Sudeshna Pantham, San Francisco, CA (US); Himanshu Arora, San Jose, CA (US); Xi Zhang, Chicago, IL (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,387

(22) Filed: Jan. 28, 2019

(65) Prior Publication Data
US 2019/0156585 A1 May 23, 2019

Related U.S. Application Data

(63) Continuation of application No. 15/662,047, filed on Jul. 27, 2017, now Pat. No. 10,192,364, which is a
(Continued)

(51) Int. Cl.
*G06T 19/00* (2011.01)
*G06T 19/20* (2011.01)
(Continued)

(52) U.S. Cl.
CPC .......... *G06T 19/006* (2013.01); *G06F 1/1686* (2013.01); *G06F 3/002* (2013.01);
(Continued)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS 5,414,474 A    5/1995   Kamada
5,583,977 A * 12/1996   Seidl .................. G06F 3/04845
                                                         345/619
(Continued)

OTHER PUBLICATIONS

Non-Final Office Action issued in corresponding U.S. Appl. No. 14/498,832 dated Jul. 21, 2016.
(Continued)

*Primary Examiner* — Abderrahim Merouan
(74) *Attorney, Agent, or Firm* — Hogan Lovells US LLP

(57) ABSTRACT

Systems and methods for displaying 3D containers in a computer generated environment are described. A computing device may provide a user with a catalog of objects which may be purchased. In order to view what an object may look like prior to purchasing the object, a computing device may show a 3D container that has the same dimensions as the object. As discussed herein, the 3D container may be located and oriented based on a two-dimensional marker. Moreover, some 3D containers may contain a representation of an object, which may be a 2D image of the object.

20 Claims, 16 Drawing Sheets

Related U.S. Application Data continuation of application No. 14/498,832, filed on Sep. 26, 2014, now Pat. No. 9,734,634.

(51) Int. Cl.
| | | |
|---|---|---|
| *G06Q 30/06* | (2012.01) | |
| *G06F 3/01* | (2006.01) | |
| *G06F 1/16* | (2006.01) | |
| *G06F 3/00* | (2006.01) | |
| *G06F 3/03* | (2006.01) | |
| *G02B 27/01* | (2006.01) | |

(52) U.S. Cl.
CPC ............ *G06F 3/011* (2013.01); *G06F 3/0304* (2013.01); *G06Q 30/0643* (2013.01); *G06T 19/20* (2013.01); *G02B 27/017* (2013.01); *G06T 19/00* (2013.01); *G06T 2210/04* (2013.01); *G06T 2215/16* (2013.01)

(56) References Cited

U.S. PATENT DOCUMENTS

| | | |
|---|---|---|
| 5,588,098 A | 12/1996 | Chen |
| 6,597,380 B1 | 7/2003 | Wang |
| 6,912,490 B2 | 6/2005 | Dodge |
| 7,023,469 B1 | 4/2006 | Olson |
| 7,523,411 B2 | 4/2009 | Carlin |
| 7,657,065 B2 | 2/2010 | Kotake |
| 8,259,101 B2 | 9/2012 | Shimada |
| 8,290,253 B1 | 10/2012 | Wang |
| 8,452,435 B1 | 5/2013 | Vieilly |
| 8,548,267 B1 | 10/2013 | Yacoub |
| 8,582,821 B1 | 11/2013 | Feldman |
| 8,606,645 B1 | 12/2013 | Applefeld |
| 8,749,583 B2 | 6/2014 | Suzuki |
| 8,878,846 B1 | 11/2014 | Francis, Jr. |
| 8,913,285 B1 | 12/2014 | Neubrand |
| 9,075,933 B2 | 7/2015 | Stone |
| 9,135,513 B2 | 9/2015 | Takemoto |
| 9,165,405 B2 | 10/2015 | Meier |
| 9,734,634 B1 | 8/2017 | Mott et al. |
| 2002/0010655 A1 | 1/2002 | Kjallstrom |
| 2002/0093538 A1 | 7/2002 | Carlin |
| 2003/0080978 A1 | 5/2003 | Navab |
| 2003/0182072 A1 | 9/2003 | Satoh |
| 2004/0037459 A1 | 2/2004 | Dodge |
| 2007/0143082 A1 | 6/2007 | Degnan |
| 2008/0194323 A1 | 8/2008 | Merkli |
| 2009/0109240 A1 | 4/2009 | Englert |
| 2009/0244097 A1 | 10/2009 | Estevez |
| 2010/0287511 A1 | 11/2010 | Meier |
| 2010/0289817 A1 | 11/2010 | Meier |
| 2011/0090343 A1 | 4/2011 | Alt |
| 2011/0157017 A1 | 6/2011 | Webb |
| 2011/0169861 A1 | 7/2011 | Suzuki |
| 2012/0113141 A1 | 5/2012 | Zimmerman |
| 2012/0120113 A1 | 5/2012 | Hueso |
| 2012/0210255 A1 | 8/2012 | Ooi |
| 2013/0100165 A1 | 4/2013 | Komiyama |
| 2013/0106910 A1 | 5/2013 | Sacco |
| 2013/0124326 A1 | 5/2013 | Huang |
| 2013/0201217 A1 | 8/2013 | Morinaga |
| 2013/0300767 A1 | 11/2013 | Kochi |
| 2013/0342564 A1 | 12/2013 | Kinnebrew |
| 2014/0080605 A1 | 3/2014 | Peddi |
| 2015/0012426 A1 | 1/2015 | Purves |
| 2019/0286231 A1* | 9/2019 | Burns ................ G02B 27/0172 |

OTHER PUBLICATIONS

Final Office Action issued in corresponding U.S. Appl. No. 14/498,832 dated Jan. 31, 2017.

Notice of Allowance issued in corresponding U.S. Appl. No. 14/498,832 dated Apr. 25, 2017.

Non-Final Office Action issued in corresponding U.S. Appl. No. 15/662,047 dated Jun. 14, 2018.

Notice of Allowance issued in corresponding U.S. Appl. No. 15/662,047 dated Sep. 26, 2018.

\* cited by examiner

AUGMENTED REALITY PRODUCT PREVIEW

CROSS-REFERENCES TO RELATED APPLICATIONS

This application is a continuation of allowed U.S. application Ser. No. 15/662,047 entitled "AUGMENTED REALITY PRODUCT PREVIEW", filed Jul. 27, 2017, which is a continuation of U.S. application Ser. No. 14/498,832 entitled "AUGMENTED REALITY PRODUCT PREVIEW," filed Sep. 26, 2014, now U.S. Pat. No. 9,734,634; of which the full disclosure of these applications are incorporated herein by reference for all purposes.

BACKGROUND

Generating three-dimensional (3D) representations of objects typically requires more computing resources than generating two-dimensional (2D) representations of those objects, particularly when inserting the 3D representations into a computer generated environment. 3D representations, also known as 3D models, objects or images, often require the addition of texture, shadows and lighting to make the 3D representation seem real to a user. Further, when viewing a 3D object in a computer generated environment, computer generated lighting and shadows may be dynamic and need to be updated in real or near-real time.

When many objects need to be prepared to place into a computer generated environment, a system may save time and resources by generating 2D representations of the objects instead of 3D representations, particularly if the representations are generated prior to the creation of the computer generated environment. However, 2D images lack depth and other features associated with 3D models that make the 3D object seem real to a user. Accordingly, it would be beneficial to provide the user with additional information, perspective, and/or interactivity in viewing, examining, and/or considering one or more objects in a computer generated environment.

BRIEF DESCRIPTION OF DRAWINGS

Various embodiments in accordance with the present disclosure will be described with reference to the drawings, in which.

DETAILED DESCRIPTION

Systems, devices and methods in accordance with various embodiments of the present disclosure may overcome one or more of the aforementioned and other deficiencies experienced in conventional approaches to displaying three-dimensional ("3D") images in a computer generated environment (e.g., an augmented reality environment).

Various embodiments described in the present disclosure can improve an online shopping experience for a user. For example, suppose a user is considering purchasing an expensive appliance for their kitchen that is available through an online electronic marketplace. It would be beneficial if the user could, prior to purchase, view the size of the appliance on their kitchen counter without having the appliance shipped to their house. In some embodiments described herein, a user may press a button found on the appliance's product page in order to view the product in a camera environment (e.g., augmented reality).

Figure 6:
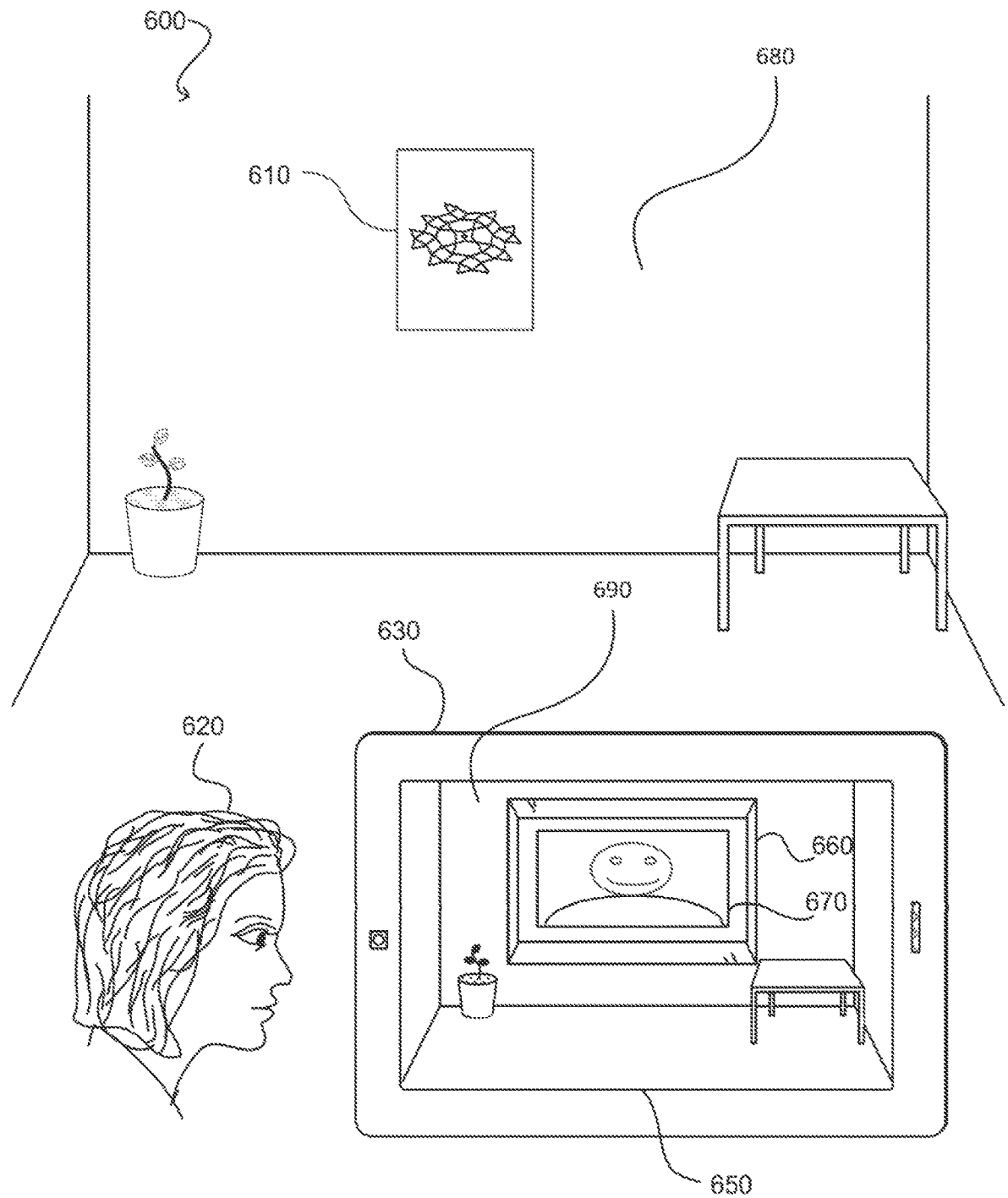
FIG. 6 illustrates an example environment in which a user can view a camera environment.

Herein, for the ease of explanation, a "real-world environment" will refer to a physical environment, wherein physical objects are present, including the computing device. The term "camera environment" will refer to an environment shown on the display of a computing device, which will typically include an image of a real-world environment and one or more 2D or 3D objects inserted into the environment, which are not physically included in the real-world environment. In other words, to simplify the explanation of various embodiments discussed in this application, when describing augmented reality the term "real-world environment" will be used to describe the environment in which a user may utilize an electronic device to capture and view images, and the term "camera environment" will be used to describe the environment shown on the display of the computing device, which may include an image of the real-world environment with an image of a superimposed object (e.g., the camera environment may be an augmented version of the real-world environment). To help with explanation, as an example, FIG. 6 shows a real world environment 680 and a camera environment 690.

Moreover, herein the term "pose" of an object with respect to another object can refer to the position and orientation of an object with respect to another object. For example, a computing device may determine the pose of a container, box, marker, or other object with respect to the computing device, based at least in part on an image captured by the computing device. Additionally, the pose of a computing device may be based at least in part on data associated with the computing device with respect to another object such as a marker. Further, the pose of a computing device, or another object, may be based at least in part on data derived from components within a computing device, such as a gyroscopic sensor, an accelerometer, and/or a location determination component. For example, the pose of a computing device may be determined at least in part on the location of the device and/or the direction of g (also referred to as "little g"), which is the direction of the downward force associated with gravity and can be used to determine the orientation of a computing device.

In some embodiments, a user's electronic device may be configured to use stereoscopic cameras, infrared, light coding, etc. in order to capture data representing a real-world environment, and subsequently create a camera environment that includes a superimposed 2D or 3D object. These methods are collectively referred to herein as markerless pose tracking, as they do not require a marker. Alternatively or in combination, a user may place a two-dimensional marker (e.g., a pattern of shapes, a quick response (QR) code, etc.) on a surface in order to view the size and/or pose (i.e., location and orientation) location of an appliance on a counter.

Based at least on the dimensions and pose of a two-dimensional marker, an object may be generated in a camera environment with a particular size and in a particular pose. As discussed above, generating 3D objects is difficult and often requires more computing resources than generating 2D objects, particularly if an online retailer, for example, created 3D products for each product in a very large catalog of products. As such, in embodiments described herein, virtual containers are used to represent objects, such as those available for purchase in an online catalog. These containers may be at least partially transparent such that a user viewing the container in a camera environment can see objects and surfaces behind the container. Containers may have edges with a different transparency than the surfaces of the container, such as 0% transparency or solid, such that a user may clearly see the edges of a container. Containers may comprise surfaces that contact each other at an edge at a ninety degree angle, such as a cube or rectangle. In some embodiments, containers may have rounded or smooth edges where the container's surfaces meet. Containers may be moved or rotated based on input provided by a user (e.g., by using gestures on a touch screen) in order to determine if an object would fit in various positions. In some embodiments, containers are sized such that the dimensions of the container shown in a camera environment have the same dimensions as the object. The size of a container can be determined in a variety of ways. For example, the size of a container may be based at least in part on metadata associated with an object in a catalog of objects (e.g., a database of products that includes properties associated with those products). Metadata associated with an object may include, but is not limited to: the size of an object, the dimensions of an object, a vector or matrix associated with an object (which may be used to orient a container or a representation of an object added to a camera environment), images of an object, tags indicating that an image is of the front, top, or rear of an object, a product page associated with the object, a unique identifier (ID) associated with the object, a predetermined pose of an object (e.g., the location and position of the object based on a marker and/or the direction of little g), etc.

Moreover, in some embodiments described herein, a container may include a representation of an object within the container. For example, a container may include a 2D icon representing an object, a 2D image received from a database associated with an object (e.g., one or more of the images included on the object's product page), a 3D model, etc. As will be described below in more detail, there are advantages and disadvantages associated with the various types of representations of an object used inside a container.

Using a computing device (e.g., tablet, smart phone, etc.), a user can view the camera environment including the two-dimensional marker through the computing device's display. The computing device, capturing an image or sampling a video frame, can determine that the size of the marker in the image is 200 pixels on the display screen, for example. The device can also determine the real-world environment size, for example, by receiving information associated with the real, physical marker. The device may receive additional data indicating an object's size, for example that an object is 10 inches wide, 18 inches deep, and 18 inches tall (i.e., 10"×18"×18"). Thus, a user can view a container (e.g., a box) that represents the 10"×18"×18" appliance in near-real time by simply pointing their computing device at a marker of a known size. As such, the user can make a more informed purchase, which may reduce the likelihood that the user returns an expensive appliance or other object because the object is too big.

Figure 1:
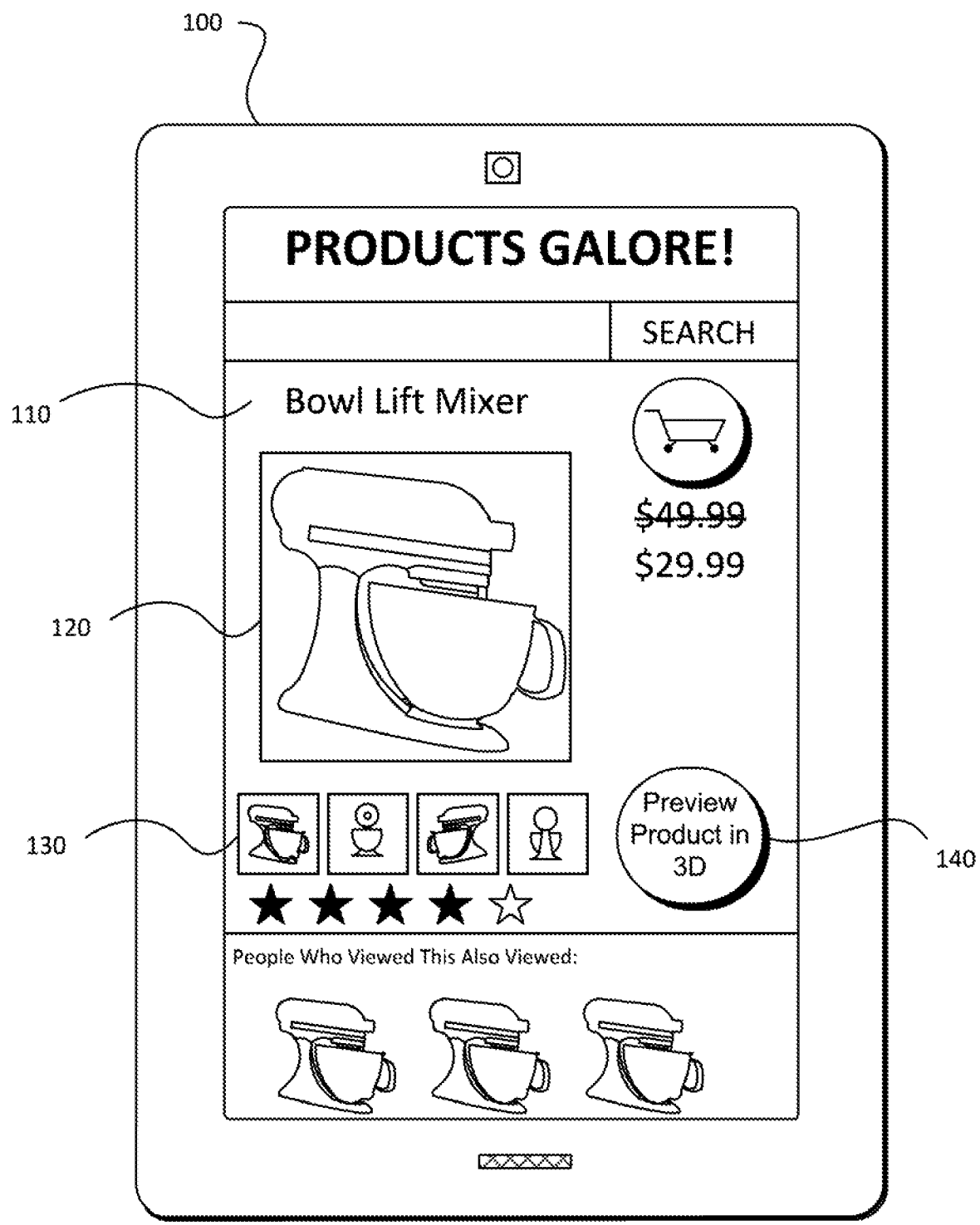
FIG. 1 illustrates an example electronic device, in accordance with at least one embodiment.

FIG. 1 illustrates an example electronic device 100. As shown, electronic device 100 includes a display 110. Display 110 is operable to show an online store where a user may access a variety of different products. As described herein, the term "catalog" may be used to describe a plurality of objects. Moreover, the term "objects" may be used interchangeably with the terms "items" and "products," for ease of explanation.

A catalog may be stored in a database either on the electronic device 100 or may be accessible by the device 100 from a server, for example, through a network (e.g., the Internet). In any case, some or all objects in the catalog may have various properties and/or attributes associated with it. For example, each item in a catalog may be associated with a unique identifier (ID), a particular product page 110, a representative 2D image 120, additional images 130, products other people have viewed, a price, a sale price, a rating, user comments, and dimensions (e.g., a product's height, width and depth), etc.

In various embodiments, the dimensions of an object can be stored in a catalog (e.g., a database) and associated with the object. For example, when a user is entering information about a product, such as its name and price, a user may enter information about the dimensions of an object. In some embodiments, a user may be prompted to enter the dimensions of a product. Still in other embodiments, a user may capture an image of a product such that a computing device is able to determine the size and/or dimensions of a product. In such a case, the dimensions and/or size of the product may be uploaded to a database with the associated image. In some embodiments, a user may have a scanner (e.g., a 3D scanner) which is able to capture the size and/or dimensions of a product. In such an example, the user may be able to upload the dimensions of the product captured with the scanner. Further, as will be described in greater detail below, in some embodiments a user may be able to upload a 3D file (e.g., an .obj file) that may be placed within a container shown in a camera environment.

In some embodiments, some or all product pages 110, or other pages associated with an online marketplace, may include a widget (e.g., button 140) that allows a user to preview at least one product in 3D. For instance, a product page 110 may have a button 140 that allows the user to view the product associated with that product page in a camera environment (e.g., an augmented view of the real-world environment that includes a container that is the size of the product).

Figure 2:
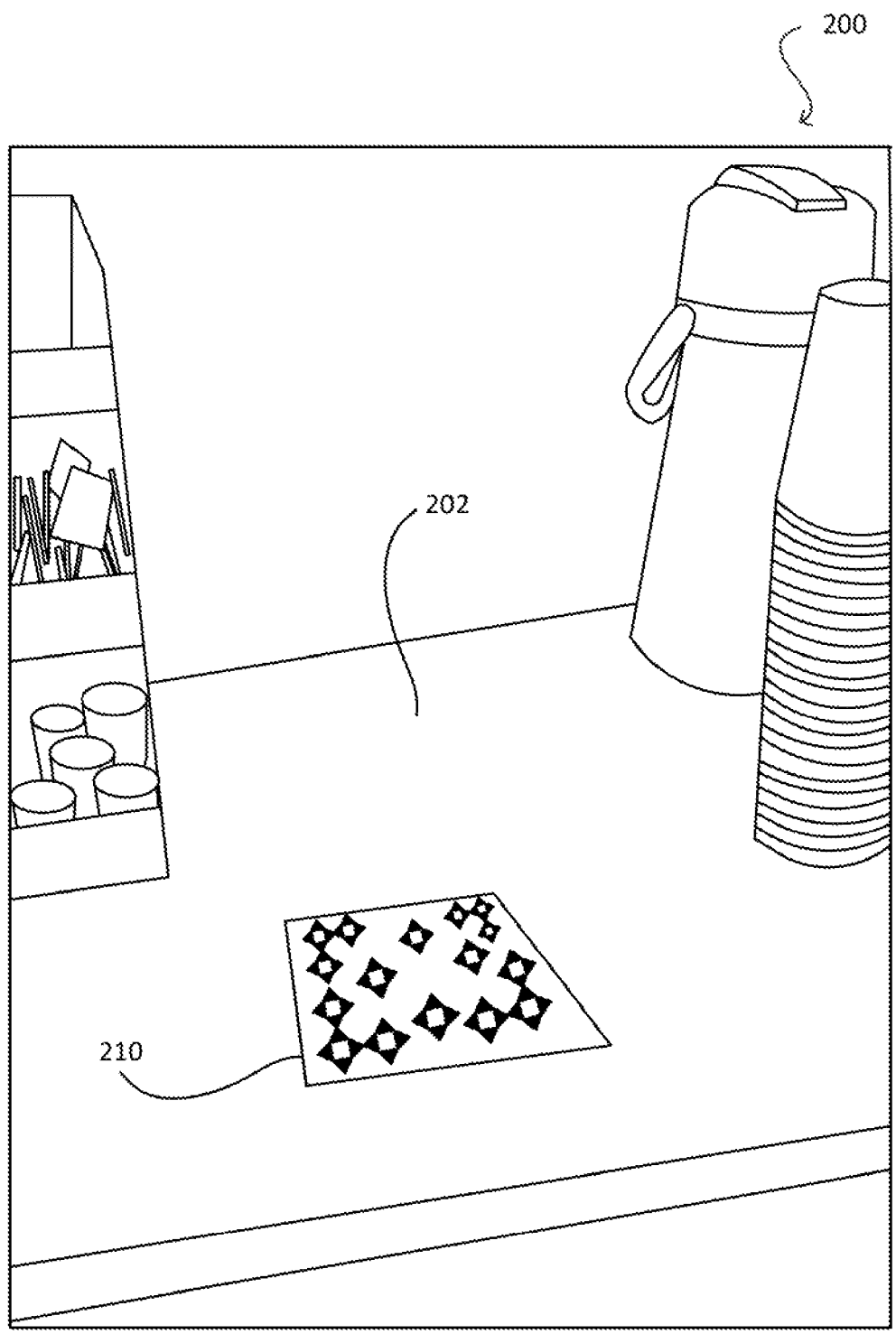
FIG. 2 illustrates an example environment in which various embodiments can be utilized.

FIG. 2 illustrates an example environment 200 in which various embodiments can be utilized. Environment 200 shows a real-world environment of a counter 202 with a few physical, real-world objects on it. One of those objects is a marker 210. Marker 210 may include different types of objects. For example, a marker 210 can be a pattern as shown, a cover of a magazine, a newspaper, a book, a piece of paper, a quick response (QR) code, a barcode, a grid, a colored grid, or any other object with known dimensions. In some embodiments, a user can obtain an image of the marker 210 and print it onto a piece of paper. The image of a marker 210 may be obtained from an online marketplace. In some embodiments, the image of the marker 210 may be received by a user via mail as opposed to being downloaded.

In some embodiments, the dimensions and/or pose of an object in a camera environment with regard to the view shown on the computing device (e.g., the camera environment) is based at least in part on a marker 210. For example, the size of a 10"×18"×18" appliance shown in a camera environment may be larger or smaller depending on the view of the computing device. By determining the physical, real-world (and thus relative) size of the marker 210, a computing device can determine the dimensions of a container to be displayed in the camera environment. The pose of a container shown in a camera environment may be based at least in part on (1) the pose of the marker 210 with respect to the computing device (e.g., an image capturing device) and (2) the pose of the computing device with respect to at least little g. Thus, by obtaining the dimensions of a virtual object to display, and the dimensions and location of the marker 210, it is possible to display a container that represents an object's dimensions correctly and posed in a camera environment. Moreover, it is contemplated that in some embodiments, approaches may be implemented where a marker 210 is out of view of an electronic device, yet the camera environment can still correctly display an object based on stored information, such as the location of the marker 210 in an image captured at an earlier point in time that includes the marker 210 (e.g., a previously captured frame). In some embodiments, the electronic device may present user interface guidance to direct users to assist in better tracking.

Figure 3:
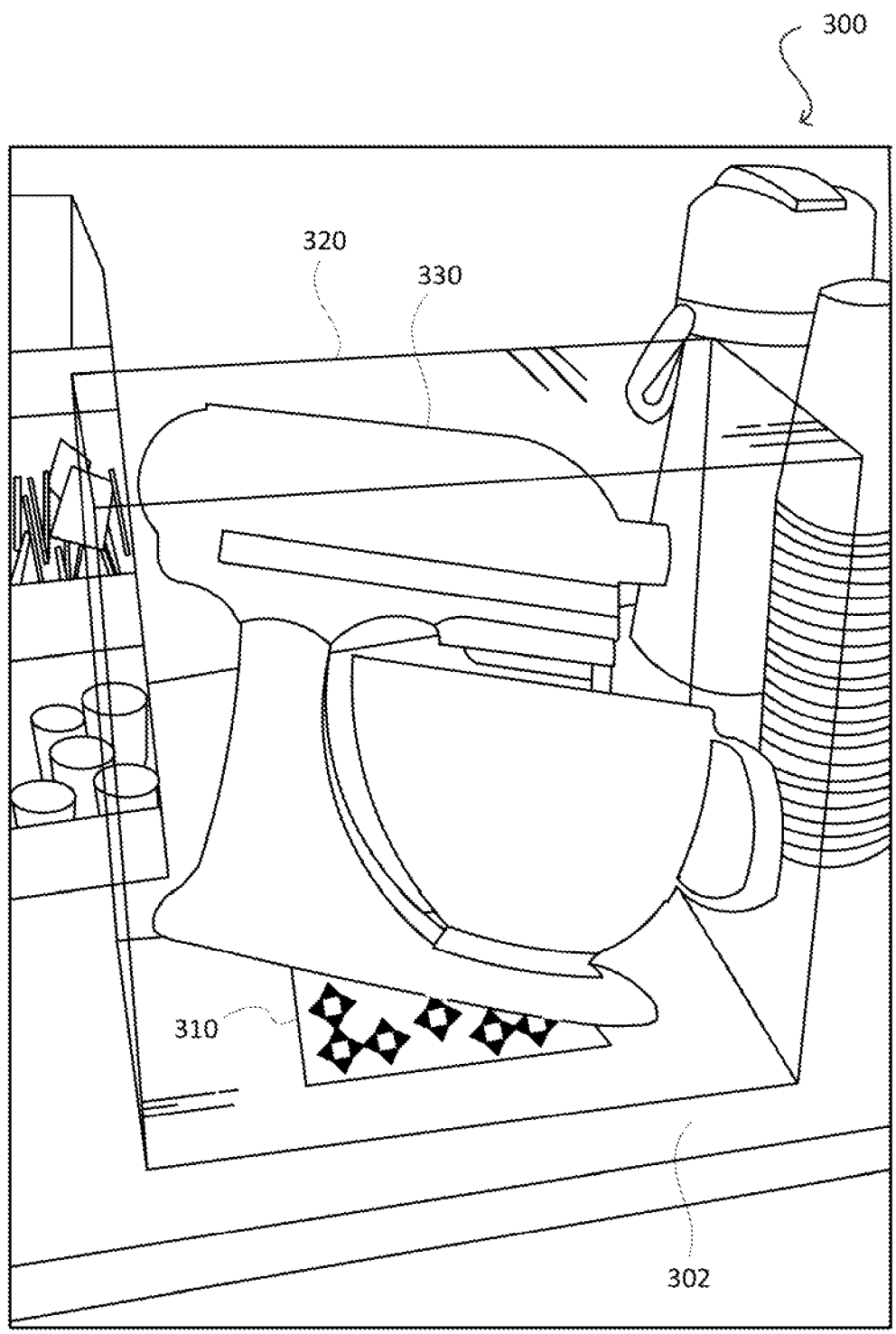
FIG. 3 illustrates an example environment in which various embodiments can be utilized.

FIG. 3 illustrates an example environment 300 in which various embodiments can be utilized. Environment 300 is a camera environment that shows a computer generated container 320 including a representation of an object 330. In this example, container 320 has a bottom surface that is located on, or parallel to, a plane that a marker 310 is on.

When uploading products to a web service (e.g., an auction site, a consumer-to-consumer (C2C) sales service, an online retailer), sellers are often prompted to input information associated with a product. For example, a seller may enter information about the name of the product, a description of a product, and provide data describing a graphical representation (e.g., one or more images) of the product. In embodiments described herein, representations of an object 330 are based at least in part on the one or more files, such as images, associated with a product.

As discussed above, a container 320 may include (e.g., encapsulate, encompass, surround, etc.) one or more representations of an object 330. Of course, in some embodiment's one container 320 may include more than one representation of an object 330. In any case, a representation of an object 330 may be generated based on an image associated with a product, such as the additional images 130 shown in FIG. 1. In some embodiments described herein, at least some objects in a catalog of objects are associated with more than one container 320 and/or representations of an object 330.

As such, in some embodiments described herein, available metadata and imagery may be used to produce comprehensible simulations of 3D objects from 2D images. In some embodiments, a 2D image itself (in conjunction with or without object dimensions) may be used to create a container. For instance, an aspect ratio and the presence of straight lines may be determined in a 2D image such that a container is created based at least in part on the aspect ratio and/or straight lines. In the absence of straight lines, a computing device may assume that the two dominant 2D dimensions correspond to the largest of the three dimensions (which may be provided as metadata). In addition, an axis of symmetry may be determined to confirm that a viewpoint is correct. Of course, in some embodiments quality assurance may be performed by a machine or by a user, for instance, to correct an axis of symmetry or confirm the correctness of a viewpoint. When straight lines are found, a computing device or user may confirm that an image of an object has not been captured at an odd perspective, creating a less than desirable version of the image/representation of the object. In some embodiments, a computing device or user may locate the straight lines of an object and estimate the edges and/or surfaces of a container based at least in part on the straight lines of the object. Of course, product dimensions may also be used to assist a computing device with the creation of a container. In some embodiments, an axis of symmetry may be based on the product dimensions. For example, a computing device may estimate that an axis is at the halfway point of the width, height or depth of an object. The representation of the object may be rendered as a thin, 2D surface in the middle of the container, allowing the customer to appreciate the actual size of the object. In some embodiments, the axis, or axes, of symmetry may be used to determine the location within a container where a representation of an object is placed. In one embodiment, a 2D image may be extruded to give an illusion of depth. For instance, a 2D image could be extruded into the $3^{rd}$ dimension to provide an estimated rendition of the depth of an object. In other words, a flat object may transformed into three dimensions by extending the flat object's depth, while the other dimensions of the product remain the same. In such a case, a 2D object which is six inches by four inches (6"×4") may be extruded such that it is two inches deep, making the new 3D object six inches by four inches by two inches (6"×4"×2"). In some embodiments, the back side of an extruded image may mirror the image on the front side of the extruded image. In various embodiments a 2D image that has been extruded may not be included in a container. As such, this extruded image may be moved, rotated, etc. without a container.

In some embodiments, a box is the object (e.g., where the object is a board game). In such an example, a container may be the size of the box. The dimensions of a box may be estimated and used to create a container for rendering including a representation of the object (in this case a box), in a camera environment. For example, if one dimension of a box is known, the other two dimensions may be determined based at least in part on an image of the box. In some embodiments, the length of one or more edges of a box may be estimated based at least in part on metadata, an image, or both.

In some embodiments, users may upload files (e.g., images) to be processed by a program that converts the uploaded files into representations of their respective associated object. Uploaded files may be converted into representations of objects 330 prior to being displayed in a container 320. Similarly, uploaded files can be optimized for a particular viewpoint associated with the angle at which a container 320 may be viewed in a camera environment before a container 320 is displayed in a camera environment. It should be noted that files suitable to upload and convert into a representation of an object may include, but are not limited to: image files, video files, files generated by a scanner, and computer aided design (CAD) files (e.g., .obj files, .stl files, .cad files).

In some embodiments, one or more 2D images uploaded by a user may be scaled to be the same size as one or more of the surfaces of a container 320 and used as a representation of an object 330. If the 2D image includes any white space (or other background), the white space may be removed such that the image does not prevent a user from seeing through the container as shown in environment 300.

It should be noted that the size of the representation of the object 330 in the container 320 may not be the size of the object itself. For instance, a representation of an object 330 may be a symbol, image or text much smaller than a container 320, which is based on dimensions associated with an object. Further, while in some embodiments the pose of the representation of an object 330 is based on the pose of a container 320, in other embodiments the pose of the representation of an object 330 may not be based on the pose of a container 320, but instead be based on the pose of a computing device relative to the real-world and/or marker 310. In another example, an object may be associated with a matrix or a vector. In such an embodiment, the pose of a representation of an object 330 may be based at least in part on the matrix or vector.

In some embodiments, an object may be associated with 2D images that are tagged (e.g., 2D images that are associated with a particular surface). For instance, an object may be associated with six (6) tagged images, which may be tagged front, back, top, bottom, left side, and right side. In some embodiments, a seller may be prompted to upload a front image, a back image, a top image, a bottom image, a left side image, and a right side image. An object may instead be tagged with a mathematical surface normal, typically corresponding to the direction vector from the object to the camera that created the 2D image. A representation of an object 330 in a container 320 may then be based at least in part on these images and their associated tags. It should be noted that more or less than six images may be tagged. Additionally, a representation of an object 330 in a container 320 may be a different shape such as an ellipse or cylinder. In some embodiments the representation of an object 330 may be a "bubbled out" cross section of a 2D image or 3D model (e.g., the area surrounding the object is removed). Further, relaxation models may be applied to a representation of an object 330 such that the edges of a polygonal representation of an object 330 appear smoother.

Since errors may occur when generating a pose for a representation of an object 330 within a container 320, quality assurance may be necessary. For instance, in some embodiments images associated with representations of products 330 may be modified prior to being displayed in a camera environment. This modification could be performed by a user, or an algorithm designed to prevent inadequate representations of an object 330. In some embodiments, a plurality of users using a plurality of computing devices may decide that a different representation of an object 330 is better. Thus, in some embodiments, a representation of an object 330 may be crowd-sourced. For example, a representation of an object 330 may be modified based on input by one or more computing devices that have, or are displaying the representation of the object 330. The representation of the object 330 may be modified based on the input of multiple computing devices to look more real based on a particular viewpoint. As another example, the representation of the object 330 may be modified to be larger or smaller, or have a filter, mask, or color applied to it.

Once a representation of an object 330 is created, it may be shown in a container 320 that represents the dimensions of an object. The container and/or the edges of the container 320 may be transparent, semi-transparent, or solid. For example, a container 320 may resemble shaded glass with solid edges, such that a user can preview the size of an object and see through the container 320.

When viewing a container 320 in a camera environment, the container 320 also has an associated size and pose. As briefly described above, the pose of a container 320 may be calculated in a variety of ways.

In one example, the computing device may determine the pose of a container 320 by first determining the computing devices: (1) pose relative to the real-world environment (e.g., relative to little g and/or a relative to another object in a real-world environment); and (2) pose relative to a marker 310 (e.g., based on a sampled frame or captured image). Based on the computing device's pose relative to the real-world environment and its pose relative to a marker 310, the pose of the container 320 shown in the camera environment may be determined.

In another example, a product may be associated with a matrix or a vector. In such an embodiment, the pose of a container 320 in a camera environment may be determined based at least in part on the matrix or vector and the pose of the computing device.

In various embodiments described herein, a container 320 may be confined to having one of its surfaces on a plane. For example, in some embodiments a marker 310 may be flat upon a surface as shown in FIG. 3. A container 320 may have one of its surfaces on a plane that a marker 310 is on, or a plane parallel to the plane a marker 310 is on. It should be understood that while a marker may be flat on a counter 302 (e.g., on a plane perpendicular to the direction of the force of little g), in other embodiments a marker may be located on a wall (such as shown in FIG. 6).

Further, in some embodiments input at a computing device (e.g., gestures on a touchscreen) may cause a container 320 to move within a camera environment. For example, a user may want to move the container 320 that an appliance is shown in to a different part of the counter 302 shown in environment 300. In some embodiments, a container 320 may be confined to moving with one of its surfaces on a plane, which may be on or parallel to the plane that a marker 310 is on. Of course, in some embodiments collision detection may be employed to prevent a container 320 from overlapping with an object in the real-world (regardless of whether the computing device utilizes a single camera, stereoscopic vision, etc.).

Similarly, in some embodiments a container 320 may be rotated. For example, a container 320 may be rotated along an axis perpendicular to a plane that the marker 310 is on. In some embodiments, a container may be rotated such that a different surface of the container is on a plane on, or parallel to, the plane that the marker 310 is on.

Figure 4A:
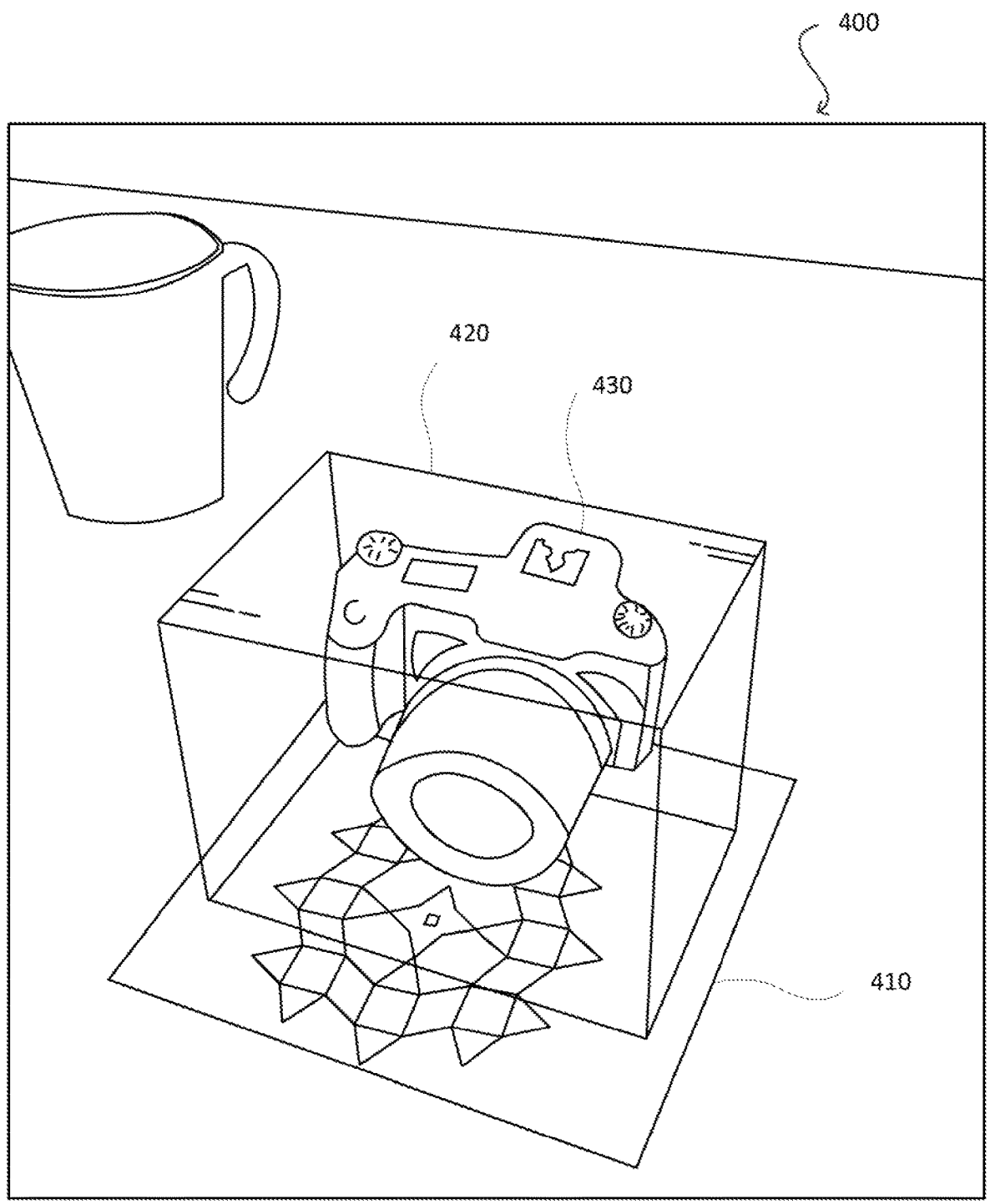
FIGS. 4A-4C illustrate an example product preview in accordance with various embodiments.
Figure 4B:
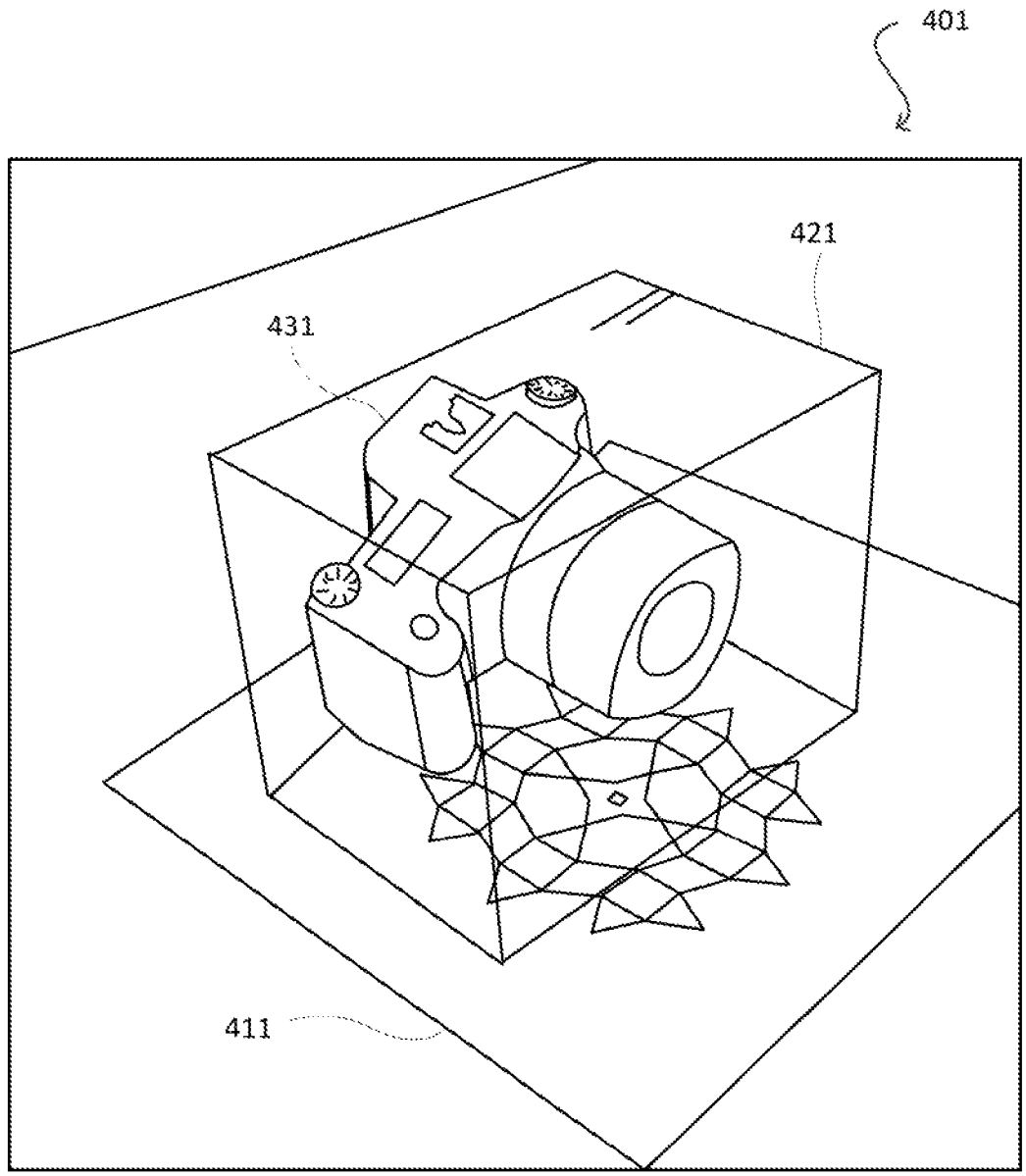
Figure 4C:
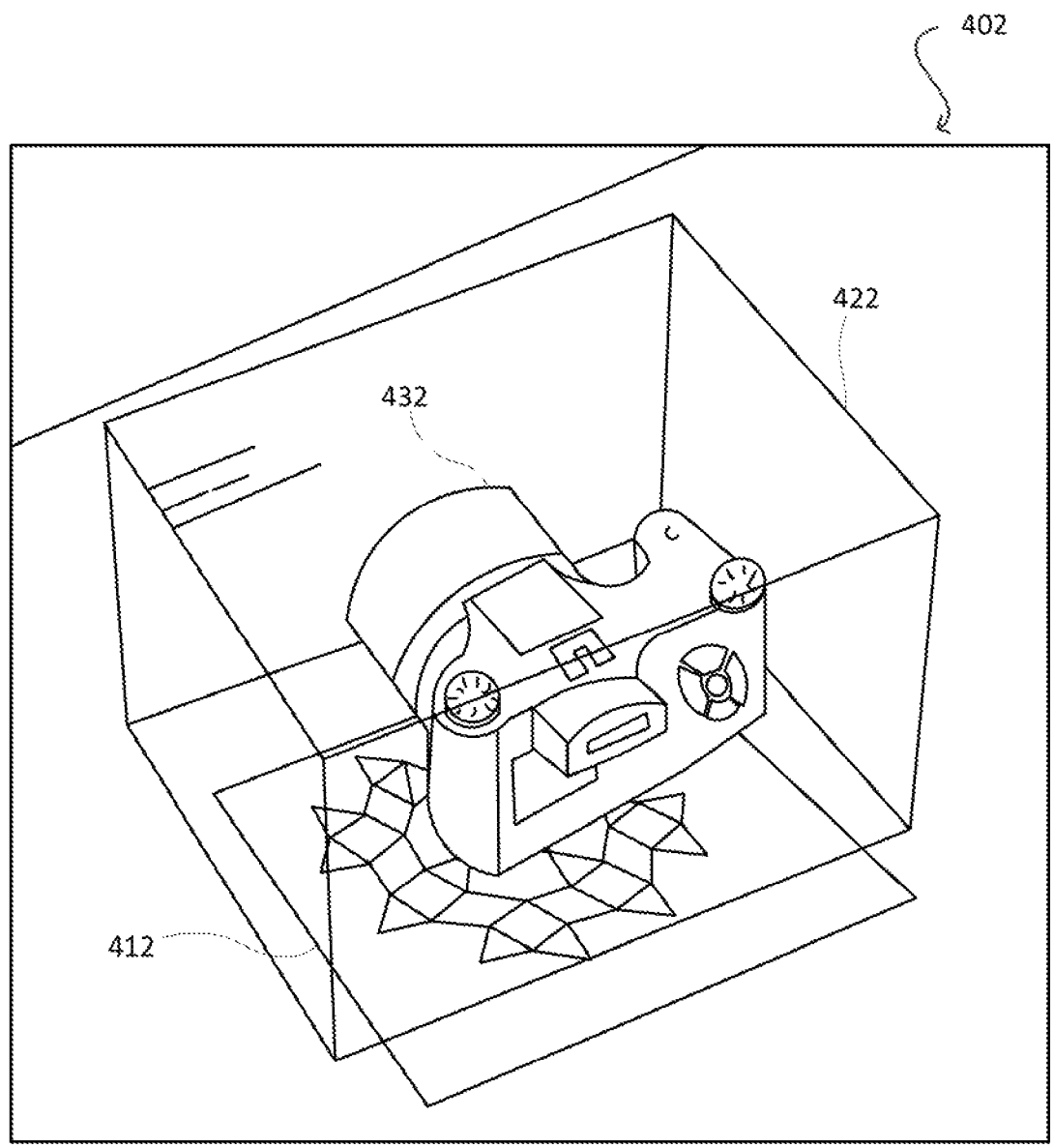

FIGS. 4A-4C illustrate example environments 400, 401, 402 with containers 420, 421, 422 that include representations of an object 430, 431, 432. In FIGS. 4A-4C, an image of a camera is shown as the representation of an object 430, 431, 432.

A user holding a computing device may desire to move around a container 420 such that they can see the container 420, or the representation of the object 430 inside the container, from a different viewpoint. FIGS. 4A-4C illustrate a camera environment that a computing device might display in various embodiments. FIG. 4A illustrates a camera environment of: (1) a marker 410; (2) a container 420; and (3) a representation of an object 430, that are viewed from a first angle. If a user moved to their left, their computing device may display environment 401. Environment 401 illustrates a camera environment of: (1) a marker 411; (2) a container 421; and (3) a representation of an object 431, that are viewed from a second angle. If a user moved even further to their left, around to the back of the container 421, their computing device may display environment 402. Environment 402 illustrates a camera environment of: (1) a marker 412; (2) a container 422; and (3) a representation of an object 432, that are viewed from a third angle. Of course, as described above, the pose, direction, and/or angle of the containers 420, 421, 422 and/or representations of objects may be based in part on the pose of the markers 410, 411, 412.

In some embodiments, a representation of an object 430, 431, 432 may look real from more or less than the three angles shown in environments 400, 401, 402. For instance, a representation of an object 430, 431, 432 may be based at least in part on a 3D model, CAD file, or scanned image such that the representation of the object 430, 431, 432 appears to be posed in a realistic manner from many, if not all viewing angles (e.g., as determined in part by the pose of a computing device). Note that a mathematical surface normal associated with each representational image can be used to choose which image to display from various viewing angles.

In some embodiments, a representation of an object 430, 431, 432 may not appear to be posed in a realistic manner. For example, an object in a catalog may only have 1, or a set of 2, 4 or 6 images associated with it. In embodiments described herein, a representation of an object 430, 431, 432 may be based on an image selected from a set of images associated with the object. The selected image may be based on the relative poses of a computing device and a marker 410, 411, 412.

FIGS. 5A-5D illustrate example approaches to changing the representations of an object 530, 531, 532, 533 in a container 520, 521, 522, 523. Here, environments 500, 501, 502, 503 illustrate representations of a camera environment that a user might view through a computing device as they move around a marker 510, 511, 512, 513. In the example illustrated in FIGS. 5A-5D, two-dimensional images are used for illustration purposes. However, in some embodiments, 3D images may be used to generate a representation of an object 530, 531, 532, 533.

Environments 500, 501, 502, 503 illustrate what is commonly referred to as the "billboard effect." In other words, environments 500, 501, 502, 503 illustrate the illusion that occurs when the near side of a representation of an object 540, 542 and the far side of the representation of an object 550, 552 appear to have particular lengths (e.g., heights or widths), and as a result of the viewpoint moving to a new angle, as shown in environments 501 and 503, one side of the representation of the object 541, 543 will appear longer relative to the opposite side of the representation of the object 551, 553. For example, as a user moves around a container 520, 521, 522, 523 as shown in FIGS. 5A-5D a representation of an object 530, 531, 532, 533 looks less real to a user when there are fewer images used to create it.

In some embodiments, the containers in FIGS. 5A-5D may appear to rotate smoothly as a user and their computing device move clockwise around containers 520, 521, 522, and 523. However, as a user moves and a new image is selected as a representation of the object 530, 531, 532, 533, the change in images may appear jarring to a user, particularly if there are few images that the representation of the object 530, 531, 532, 533 can be based upon.

Figure 5A:
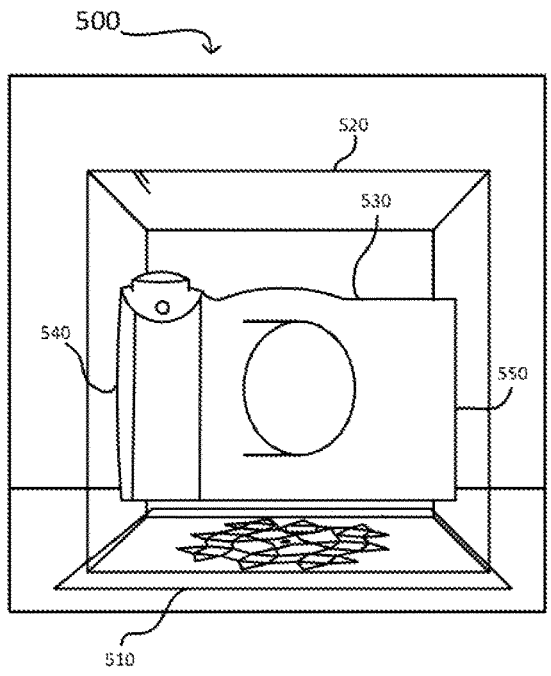
FIGS. 5A-5D illustrate an example approach for previewing an object in accordance with various embodiments.
Figure 5B:
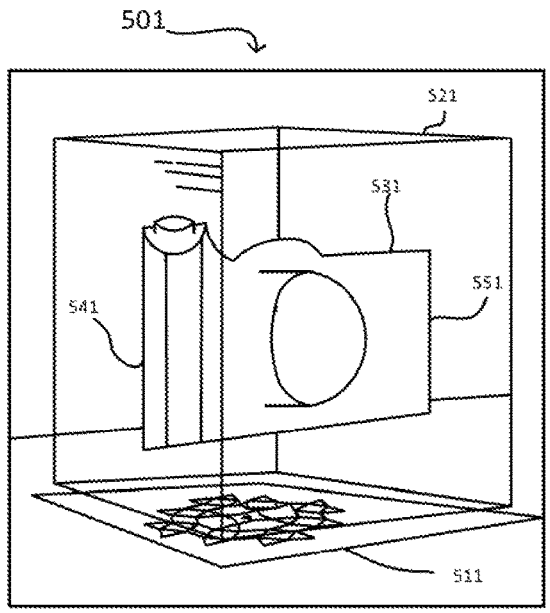
Figure 5C:
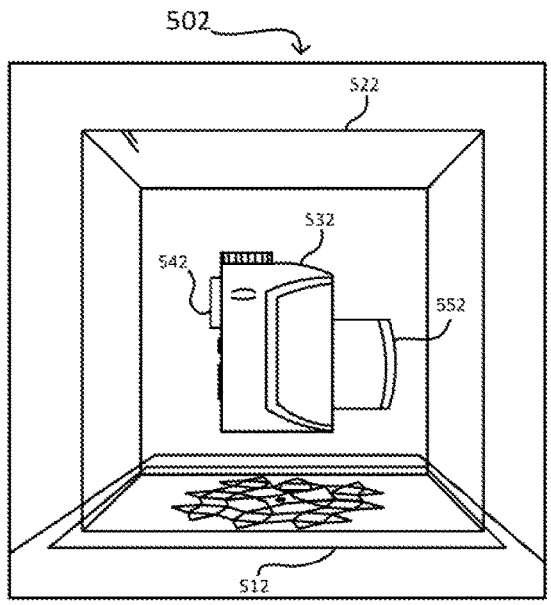
Figure 5D:
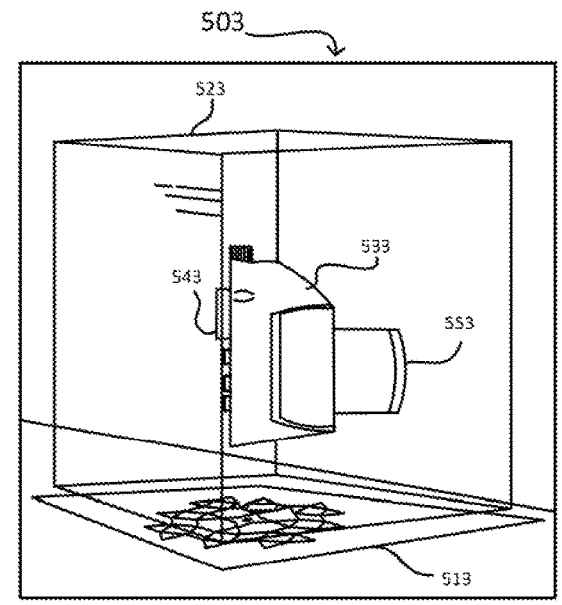

Various techniques may be implemented to reduce jarring in order to create a smooth, more fluid user experience. For example, one image associated with the object may fade into another image associated with the object based at least in part on the pose of the computing device as the computing device captures the real-world environment from different angles/viewpoints. For example, if a computing device is capturing one or more images from at least a forty-five (45) degree angle from a front surface of a container (e.g., as shown in FIG. 5A and FIG. 5B), and then the computing device moves such that it is capturing one or more images at less than a forty-five degree angle from the front of the container (e.g., as shown in FIG. 5C), a representation of an object (e.g., 530 and 531) displayed inside the container (e.g., 520 and 521) may change to another representation of an object (e.g., 532) inside a container (e.g., 522) based on the new angle of the computing device with respect to a container 520, 521, 522, 523. For instance, if a computing device rotated around a container 520, 521, 522, 523 to the left, a representation of the left side of an object (e.g., 532) may become visible when the computing device moves such that, for instance, the computing device is facing the side of a container (e.g., 522) at an angle that is greater than forty-five degrees. In example embodiments, various techniques may be used to smooth the transition between representations of objects 530, 531, 532, 533 inside a container 520, 521, 522, 523. Further, it should be understood that forty-five degrees is only used as an example, and various thresholds may be used to determine how and when to change the representation of an object 530, 531, 532, 533 (e.g., transition from one representation of an object to another representation of an object) inside a container 520, 521, 522, 523. In some embodiments it may be more visually pleasing to always orient the billboard so that the image normal remains aligned with the direction to the camera, so that as the user moves to the left, the image rotates to always face the user, thus avoiding additional perspective effects which may be jarring if the image itself already contains perspective artifacts from when it was captured. This alignment could be constrained to two dimensions so that the billboard is also always upright.

Since errors may occur when changing and modifying the representation of an object 530, 531, 532, 533 within a container 520, 521, 522, and 523, quality assurance may be necessary. For instance, in some embodiments images associated with representations of products 530, 531, 532, 533 may be modified prior to being displayed in a camera environment. This modification could be performed by a user, or an algorithm designed to prevent inadequate representations of an object 530, 531, 532, 533. In some embodiments, a plurality of users using a plurality of computing devices may decide that a different representation of an object 530, 531, 532, 533 is better. Thus, in some embodiments, a representation of an object 530, 531, 532, 533 may be crowd-sourced. For example, a representation of an object 530, 531, 532, 533 may be modified based on input by one or more computing devices that have, or are displaying the representation of the object 530, 531, 532, 533 to make a representation of the object 530, 531, 532, 533 look more real based on a particular viewpoint shown in a camera environment.

FIG. 6 illustrates an example environment 600 in which various embodiments can be utilized. As shown, a user 620 is looking at a computing device 630. Computing device 630 includes a display 650 and at least one camera on the back. Environment 600 also includes a marker 610 in the real-world environment 680. In this example, in the camera environment 690, the marker 610 is covered by a representation of an object 670 (in this example, a television), inside a container 660.

As described above, FIG. 6 also illustrates the difference between a real-world environment 680 and a camera environment 690. As shown in FIG. 6, a camera environment 690 is an environment shown on a computing device, which may include a container. Camera environments are often derived from real-world environments 680, for instance, by capturing an image of a real-world environment 680 and displaying it on a computing device 690.

Unlike FIGS. 2-5D, FIG. 6 shows a marker 610 on a wall. As described above, a computing device's 630 pose relative to the marker 610 can be used to determine the location of container 660. A computing device's pose can be determined based at least in part on a gyroscopic sensor and/or an accelerometer in the computing device 630. In this example camera environment, the back side (relatively speaking) of the container 660 is located on a wall, which is on a plane parallel to, or on, the plane that the marker 610 is on. As with the containers described above, the container 660 may be moved by a user along a plane parallel to, or on the plane of the marker.

Figure 7:
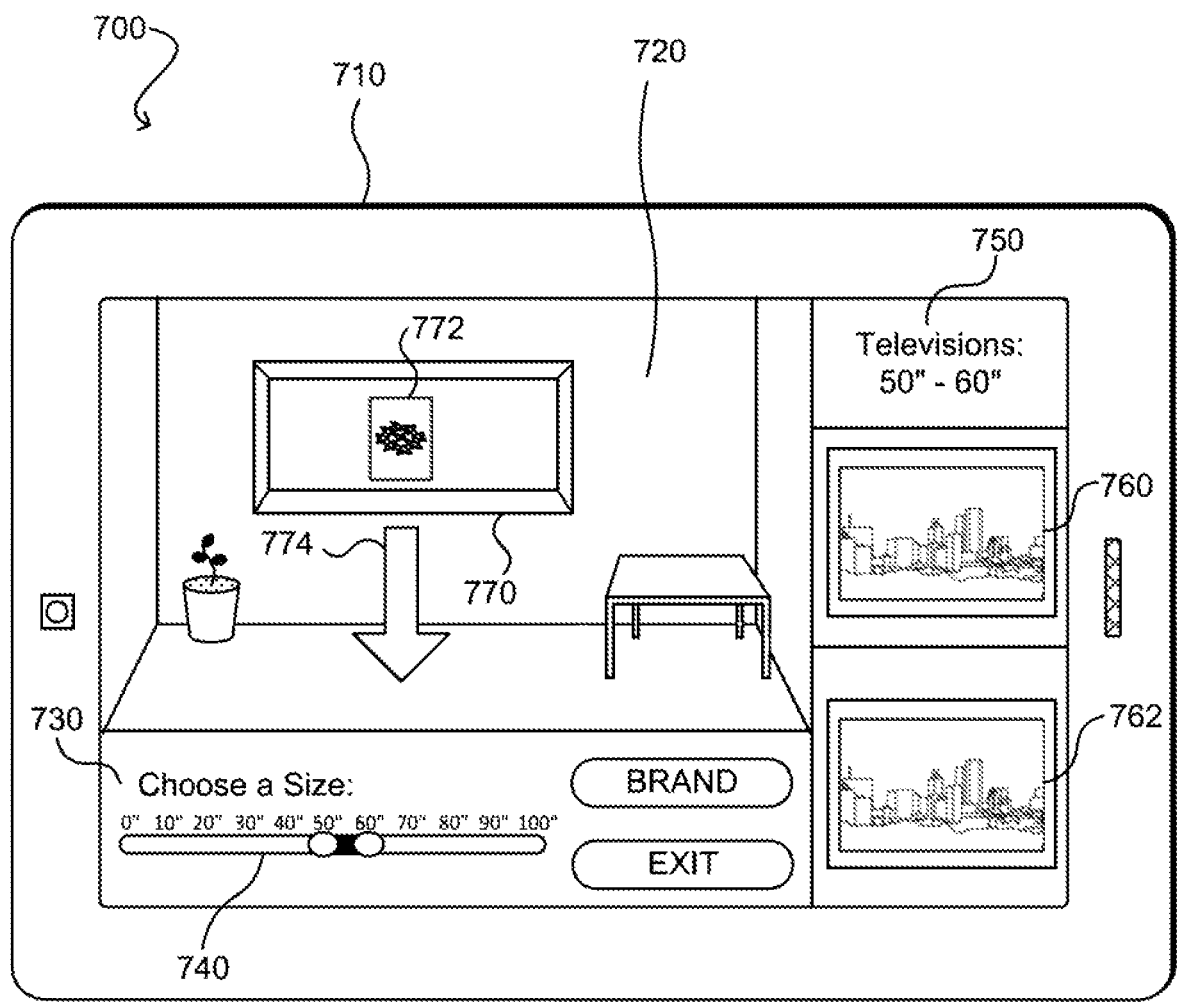
FIG. 7 illustrates an example environment in which a user can modify the size of a virtual container.

FIG. 7 illustrates an example environment 700 in which various embodiments can be utilized. Environment 700 includes a computing device 710. The example user interface 720 shown in FIG. 7 allows a user to select a size and type of object. In this example, the object is a television. In various examples, a user may manipulate a control 740 that allows a user to change the size of a container 770. For example, user interface 720 shows an example control panel 730 configured to receive an input that manipulates control 740, which in turn changes the size of the container 770. In example environment 700, a user has used control 740 to select televisions that are between fifty (50) and sixty (60) inches. It should be understood that various types of controls 740 may be used to change the size of a container 770 or a representation of an object. While control 740 shows a bar with two knobs, buttons or text containers may be used as a control 740, for example. Also, gestural input on a touch screen could be used directly without a control, for instance a pinch gesture could scale the desired size bigger or smaller. In this example, a user has the ability to change the brand of an object, such as a television.

In addition to container 770, example environment 700 shows a marker 772. As briefly described above, marker 772 may comprise information that can be used to determine the direction of little g 774. The direction of little g 774 may be determined using gyroscopic sensors and/or accelerometers included in the computing device. Information associated with the marker and the direction of little g 774 may be used to determine the orientation of a container and/or a representation of an object. In example environment 700, the direction of little g 774 is toward the ground. This allows the computing device 710, or a remote computing device, to determine that the marker is located on a wall, and to place a representation of a television or other object such that the bottom of the television is closest to the bottom surface of a box. Similarly, if a marker were placed on a counter, information in the marker may indicate that the bottom of a television should be closest to the bottom surface of the box, such that the bottom of the television appears to be on the counter.

Example user interface 720 also includes a section 750 that displays objects 760, 762 which may be based at least in part on selections made with a control 740. For example, control 740 indicates that televisions between fifty and sixty inches are included in section 750. In some embodiments, a control 740 may determine the types of objects 760, 762 that can be placed in a camera environment. It should be noted that example user interface 720 is one of a variety of ways in which a user interface could be configured. For example, in some embodiments, the objects 760, 762 may be displayed side by side, or beneath a camera view section of a user interface. Further, in some embodiments, the objects may not be displayed while a computing device is displaying a camera view. For instance, a catalog may be provided such that a user selects an item before it is displayed in a camera view. In some embodiments, a device may be configured to receive a selection of an item in a catalog, then display that item in a camera view (or a representation of an object, for example), then the device returns to a product page where a user may select another object (or representation thereof) to view in a camera view. Similarly, in some embodiments, a user may view a collection of images and select an image to place into a container. For instance, a user may perform an image search and select an image resulting from the search. A user may view an image (e.g., a representation of an object) in a container in a camera view, and then return to the search results or other collection of images to choose a different image to place in a container in a camera view. In some embodiments, an example user interface 720 may appear different on various computing devices based on characteristics related to the various computing devices, such as the size of a display or the computing device's processing power.

In this example, section 750 may display at least a portion of a set of objects 760, 762 that fit within container 770. For example, section 750 may display all televisions that are for sale and between fifty and sixty inches. In some embodiments, a container 770 is displayed based at least in part on the dimensions of an object such as a television selected by a user. A control 740 may be available that allows a user to enter a multiplier (e.g., a percentage), such that only objects that fit within the 740 container multiplied by the multiplier are provided in example section 750. This allows a user to see televisions that are a particular percentage smaller than the currently displayed television.

Figure 8:
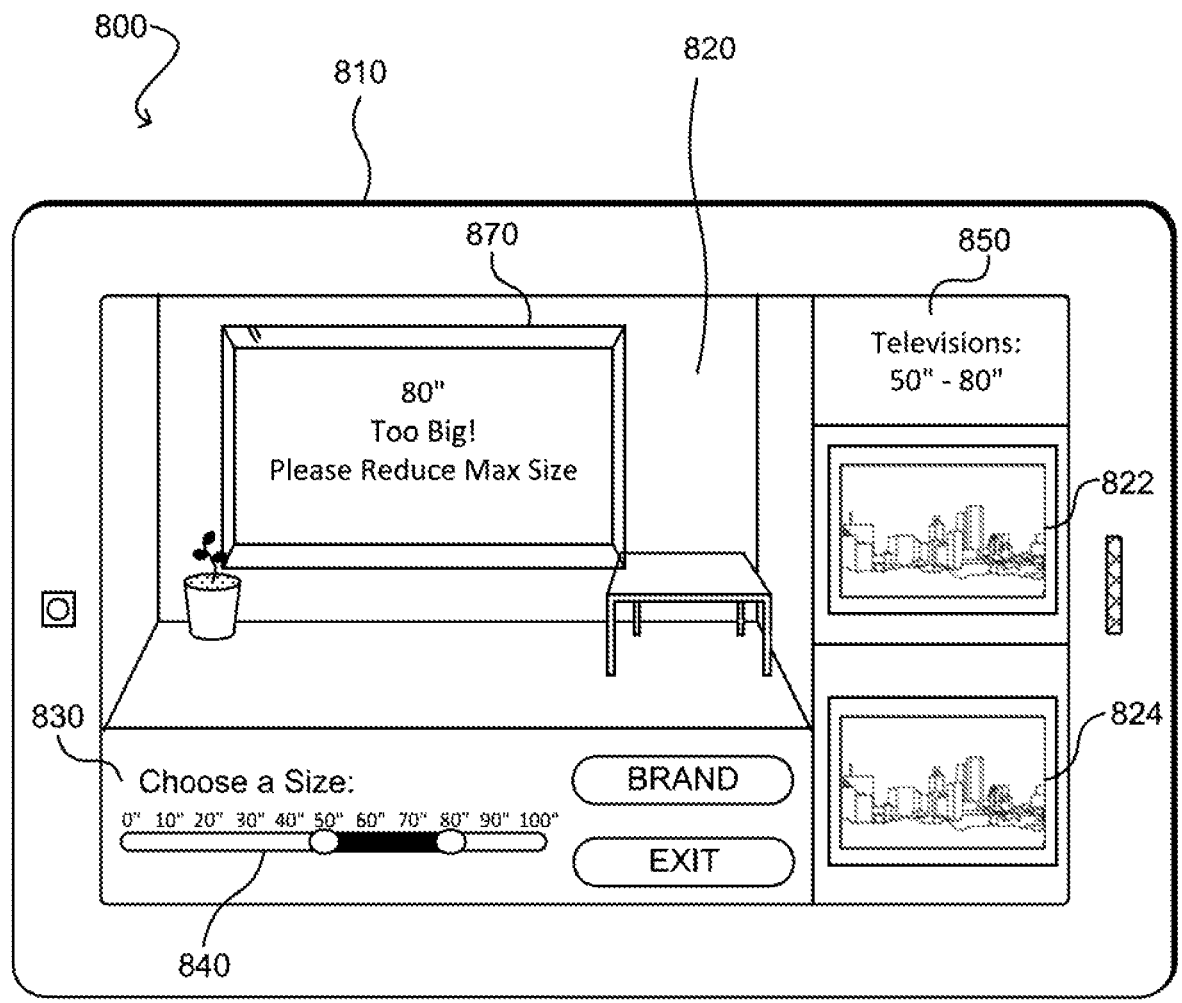
FIG. 8 illustrates an example environment in which a user can modify the size of a virtual container.

FIG. 8 illustrates an example environment 800 in which various embodiments can be utilized. Similar to environment 700, environment 800 shows a computing device 810, an example user interface 820, a control panel 830, a control 840, a section 850 that displays objects 822, 824 that may be part of a catalog. It should be noted that not all containers include images, and may include text or notifications as shown in FIG. 8.

FIG. 8 also illustrates an example embodiment where a container 870 collides with another object, for instance, after being moved. In various examples described herein, an at least semi-transparent container indicates the dimensions of an object. If a container collides (or overlaps) with another object in a camera environment, a user may be notified in a variety of ways. It should be noted that a baseline may need to be established for a monocular computing device in order to determine the pose and/or dimensions of various objects as shown in a camera environment in order to indicate collisions. Markerless embodiments (e.g., approaches that implement computing devices that have stereoscopic, infrared, or other depth sensing capabilities and do not require a marker as discussed in other embodiments described herein), on the other hand, may not need to establish a baseline for determining the pose and/or dimensions various objects shown in a camera environment.

In some embodiments, an edge and/or face of a container 870 may change color (e.g., it may turn from green to red) when a collision between a container 870 and an object, based upon an object in the real-world, environment is detected. In another example, a computing device 810 may prevent a user from moving an object such that it overlaps with another object in a camera environment (e.g., the container 870 stops moving when it collides with an object that is based on an object in the real-world environment).

Figure 9:
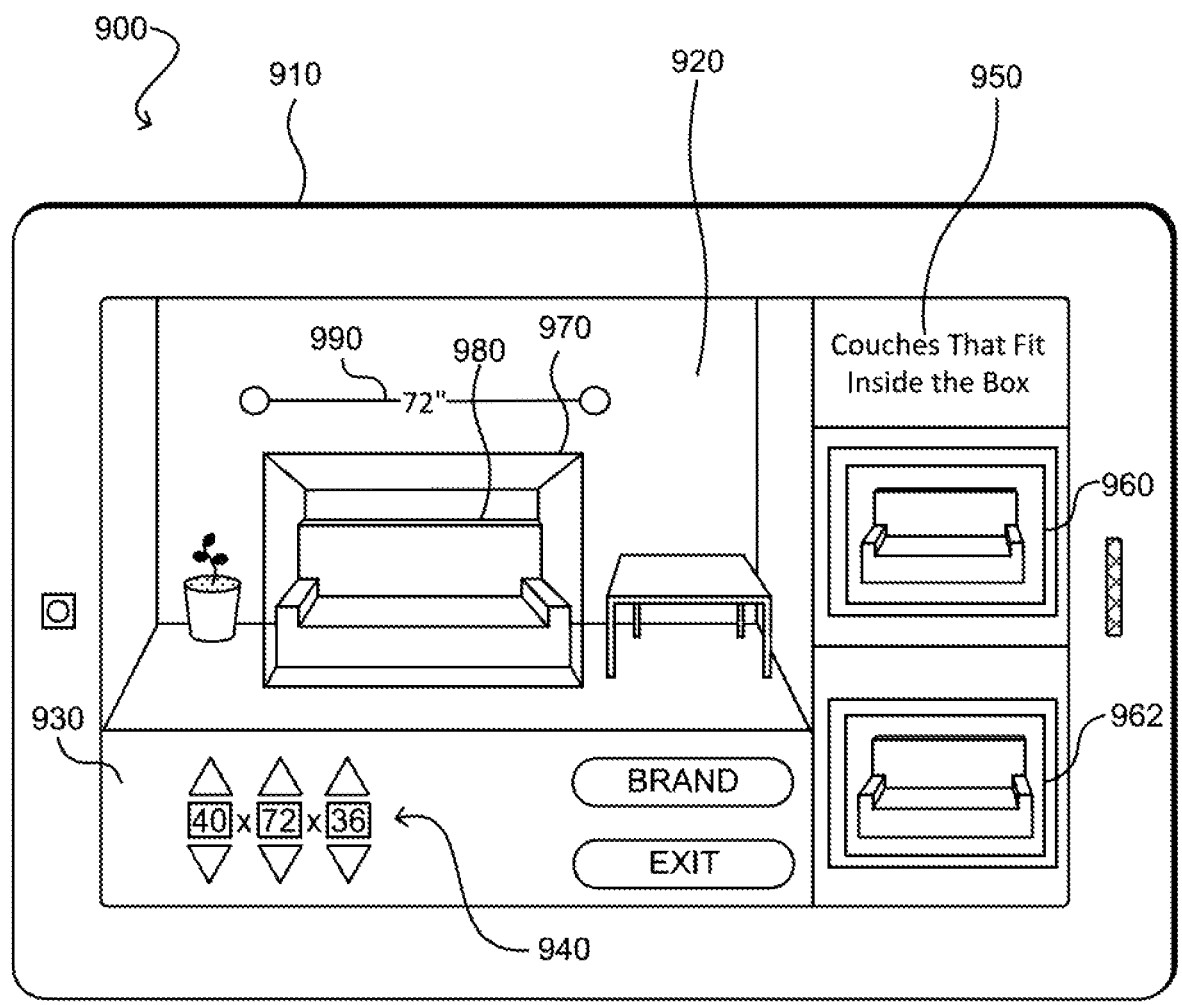
FIG. 9 illustrates an example environment in which a user can modify the size of a virtual container.

FIG. 9 illustrates an example environment 900 in which various embodiments can be utilized. As shown, environment 900 includes a computing device 910 with an example user interface 920. Example user interface 920 includes a control panel 930 with a control 940. Example interface 920 also includes a camera environment that includes container 970 and a representation of an object 980, in this case a couch. Example user interface 920 also includes a section 950 with additional objects 960, 962.

In addition to control 940, example user interface 920 also includes a second control 990. In this example, both controls are configured to modify the size of container 970. For instance, a user may enter a dimension of a container 970 using the character fields in control 940. Similarly, the arrows in control 940 may also be configured to adjust the dimensions of a container 970. Control 990 is similar to other controls described herein, but is located within a camera environment. Control 990, in accordance with various embodiments, may be manipulated (e.g., by dragging one or more handles) in order to modify the size, dimensions, location, and/or orientation of container 970. Although not shown, in some embodiments it is contemplated that a user may modify the size (e.g., dimensions) of a container 970 simply by manipulating the container 720 itself, such as by using a touch screen to drag a corner of a container 970.

In various embodiments, the objects 960, 962 may change based upon the size of the container 970. For instance, if a user makes container 970 smaller or larger by manipulating control 940 or control 990, the objects 960, 962 in section 950 (e.g., couches that fit inside the container 970) may change based on a smaller or larger container 970.

Although not shown in FIG. 9, it is contemplated that some embodiments may allow a user to select the size of a container 970, and submit a search term to a search engine which returns results in the form of objects 960, 962 that fit into the selected size of a container 970. For instance, a user may enter the size of a container 970, either while a camera environment is showing or otherwise (e.g., at a product page or other website), and then a user may enter a search term such as "brown couches." In response to receiving a search term and dimensions, objects 960, 962 may be shown to a user, where objects 960 and 962 are brown couches that would fit into the selected size of a container 970. In some embodiments, the objects may be shown in an example user interface 920, such that the search results may be placed into a 3D container 970. In some embodiments, when searching based on a term and the dimensions of a container, only the objects which have associated representations of an object 980 may be displayed. Similarly, in some embodiments, other controls may be used to narrow the objects included in a search result such as a minimum size, a color, a cost, a retailer, a brand, a manufacturer, a maximum size of a particular dimension (e.g., maximum height, maximum width, maximum depth), etc. In some approaches, it is contemplated that a suggestion engine may be implemented to provide recommendations based at least in part upon information known about a user/user ID, the dimensions of a container 970, a search term, and/or additional information.

Figure 10:
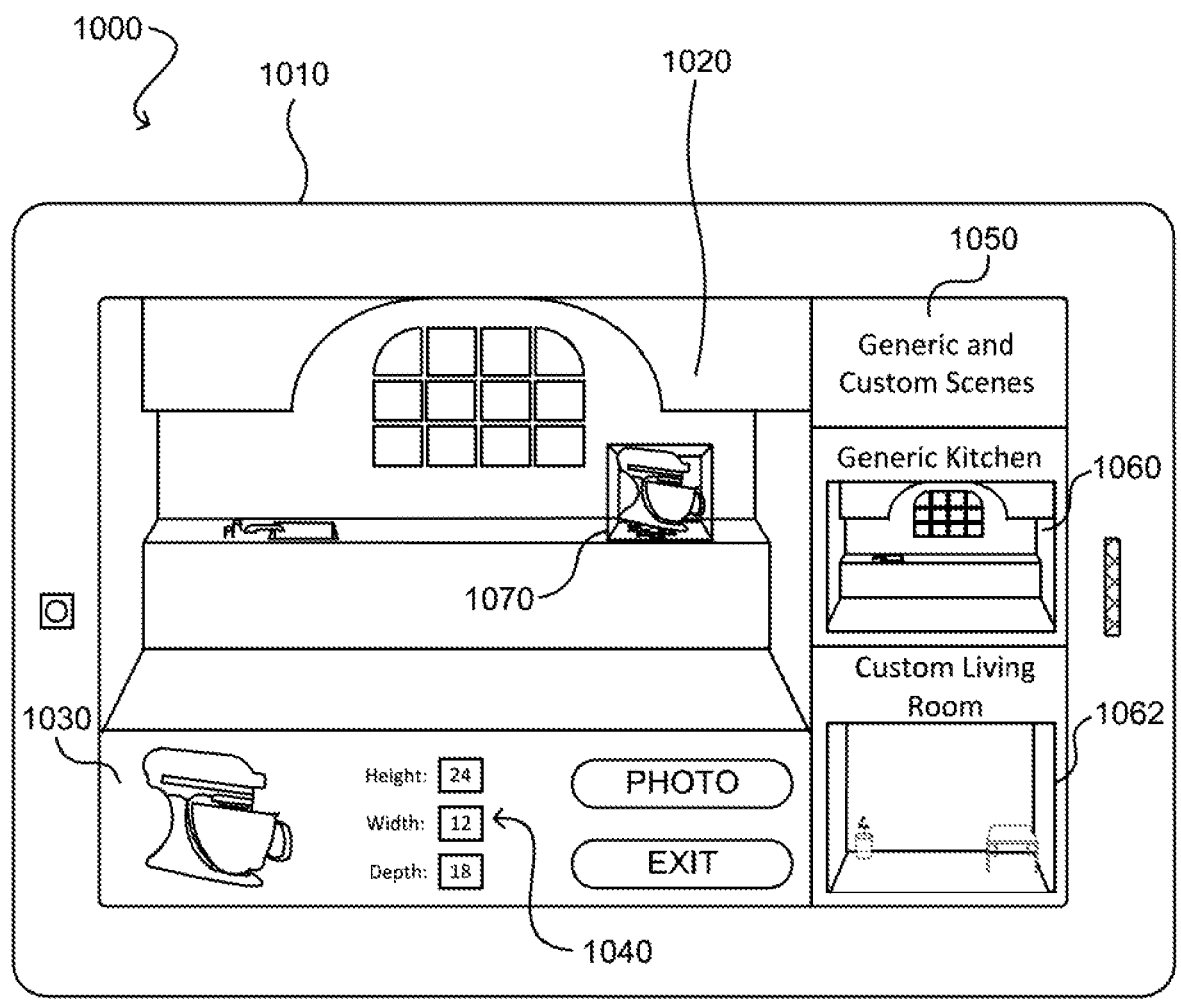
FIG. 10 illustrates an example environment in which a user can modify an environment that assists a user in choosing a product.

FIG. 10 illustrates an example environment 1000 in which a user can modify a camera environment that assists a user in choosing a product. Environment 1000 includes a computing device 1010, and an example user interface 1020. Example user interface 1020, includes a control panel 1030 and an example section 1050 for displaying scenes 1060, 1062. Further, a container 1070 is shown in example environment 1000 along with a marker and a representation of an object, in this case a kitchen appliance.

As described above, the living room scene shown in FIGS. 7-9 may be based on a real-world environment. While in some embodiments, a user may have captured a real-world environment to view in a camera environment with their computing device 1010. In some embodiments, users may be able to select real-world environments that were not generated by the user or the camera on the computing device. For example, a real-world environment may be provided to a computing device by an entity including, but not limited to: an online retailer, an application executing on a computing device, a telecommunications company, a company that designs or produces computing devices and/or applications that run on a computing device, etc.

For the ease of explanation, real-world environments created by a computing device that displays camera environments may be referred to as "custom scenes" 1062, while real-world environments created by an entity other than the computing device may be referred to as "generic scenes" 1060. In some embodiments, generic scenes 1060 may be pre-populated on a computing device or application to allow a user to become accustomed to a program before creating custom scenes 1062. For instance, the scene of the kitchen shown in example user interface 1020 may be pre-loaded onto a device or program. Similarly, objects may be pre-loaded onto a device or program. Further, in some embodiments, an application executing on a computing device may prompt a user to capture custom scenes 1062. In any case, both generic scenes and custom scenes may include containers 1070 and representations of objects as shown in example environment 1000.

In various embodiments described herein, a computing device may not be able to determine the dimensions of various objects located within a generic scene (or a custom scene for that matter). Thus, in some embodiments a control 1040 may be configured to allow a user to enter the dimensions of a particular object in a generic or custom scene. Of course, there may also be controls as described above, which allow a user to place a container in a scene, orient the container, provide dimensions for the container, enter information such as the color or brand of a product, enter an object ID, select a particular representation of an object, etc.

In some embodiments, a user may create a camera environment that includes a custom scene 1062 or a generic scene 1060, and share the created camera environment. For example, a user may send the created camera environment to their friend to get their friend's opinion on how a particular object looks in a custom scene 1062. In another embodiment, a user may share a created camera environment on a social networking website, photo-sharing website, interior decorating website, etc.

In some embodiments, a user may store a scene (e.g., custom or generic) on their computing device 1010 and insert containers that represent objects not included in a catalog of objects. For example, a user may create their own custom scene 1062 (e.g., a captured image of their living room), and insert an object that they see at a store. For example, a user may have a stored custom scene 1062 on their computing device 1010 (which may include a marker), see a lamp at a store, and view the lamp in the stored custom scene 1062. In some embodiments, a computing device 1010 may be able to determine the dimensions of an object using components included in the computing device 1010 (e.g., via stereoscopic imaging, light coding, a range camera, infrared lighting, etc.). In some embodiments, a computing device 1010 may allow a user to enter the dimensions of an object that is not included in the catalog of objects, such that the computing device may create a container, which may be inserted into the camera environment. In addition, a computing device 1010 may be configured to capture an image of an object, such as a lamp, and use that image to create a representation of an object within a container. In other words, the representation of an object in a container may be based at least in part on an image captured with a computing device 1010. In this example, a camera view is based on two images captured by a computing device 1010—the image of the custom scene 1062 and the image of the lamp. It is further contemplated that in some embodiments, artificial lighting may be added to a scene and/or camera environment.

As discussed, in various embodiments generic scenes or custom scenes may be useful for viewing objects in an environment while offline (e.g., when viewing a camera view of a room when not in that room to see how an object might fit in that respective room). In such embodiments, images of various environments may be cached (e.g., stored) on a computing device. In some embodiments, discussed above, more than one camera view may be shown as the position of the computing device changes. In some embodiments, more than one camera view may refer to a video. For example, a user may capture video such that the camera view including a container and representation of an object is shown as part of a video. In some embodiments, a user may use point a computing device and move around an object such as in FIGS. 4A-4C. In such an embodiment, different images may be used as representations of objects, or a single image may rotate such that it faces the direction of the computing device as the computing device moves. In some embodiments, custom scenes or generic scenes that are stored on a computing device may be a video (or other animated sequence) of a scene rather than only an image. For example, a computing device may receive input indicating that a video should be played of a scene (in a camera view) with a container, wherein the container may contain any representation of any object. Since the fiducial is of a known size, any container with a known size may be placed into a camera environment.

Figure 11:
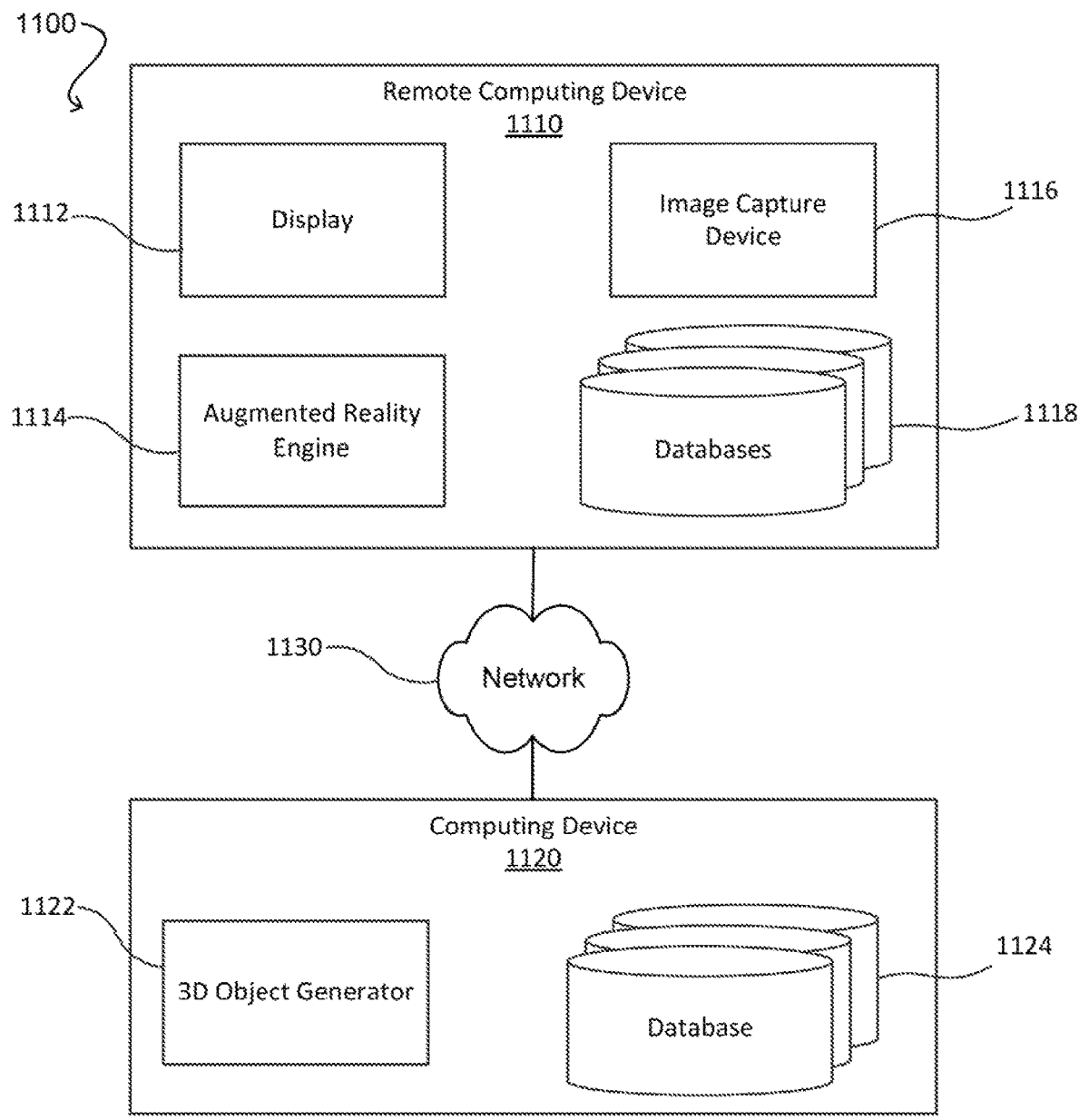
FIG. 11 illustrates an example arrangement of electronic devices and their components, in accordance with at least one embodiment.

FIG. 11 illustrates an example arrangement 1100 of electronic devices and their components. Arrangement 1100 is an example of how a system could be configured, and may include more or fewer components. Also, the components in example arrangement 1100 may be interchanged, and perform tasks described by the various embodiments disclosed herein. As shown, example arrangement 1100 shows a computing device 1120 (e.g., a server, a cluster of servers, a multi-tenant environment, etc.). In this example, computing device 1120 is communicatively coupled to remote computing device 1110 (e.g., a smart phone or tablet) using network 1130.

In some embodiments, computing device 1120 comprises at least one display 3D object generator 1122, and at least one database 1124. Database 1124 may include information associated with a catalog of objects, such as, but not limited to: object IDs, product pages associated with a product, images of objects, ratings associated with an object, comments associated with an object, a price associated with an object, dimensions associated with an object, one or more representations of an object associated with an object, one or more containers associated with an object, the direction of little g associated with an object/container/representation of an object, information associated with a container/object/representation of an object with respect to a marker, representations of an object with respect to a particular pose and/or dimensions of a container, etc. Moreover, in some embodiments database 1124 may include information associated with a generic scene and/or a custom scene.

In some embodiments, remote computing device 1110 is configured to perform at least a portion of the processing required to enable embodiments described herein, such that the computing device 1120 can include fewer components, for instance. Remote computing device 1110 may be any type of computing device including, but not limited to: smart phone, tablet, a portable electronic device, a wearable computer, a server, a plurality of servers, a laptop computer, etc. In an example embodiment, remote computing device 1110 comprises a display 1112, an augmented reality engine 1114, an image capture device 1116, and at least one database 1118. Moreover, a remote computing device may comprise gyroscopic sensors, an accelerometer, a touch screen, a microphone, a speaker, etc.

In various embodiments, the display 1112 of a remote computing device 1110 may be used to display data including, but not limited to: a real-world environment, a camera environment, a generic scene, a custom scene, a product page, an object, a set of objects, a container, a representation of an object, controls to modify the container/object/representation of an object/a set of objects, a web browser, a shopping cart, etc. An image capture device 1116 of a remote computing device 1110 may be used to collect data including, but not limited to: a real-world environment, one or more images, one or more videos, one or more frames of one or more videos, etc. Additionally, one or more databases 1118 may be included in a remote computing device 1110 and store data including, but not limited to: images captured at the remote computing device 1110, videos captured using the remote computing device 1110, real-world environments, camera environments, object IDs, product pages associated with a product, images of objects, ratings associated with an object, comments associated with an object, a price associated with an object, the dimensions associated with an object, one or more representations of an object associated with an object, one or more containers associated with an object, the direction of little g associated with an object/container/representation of an object, information associated with a container/object/representation of an object with respect to a marker, representations of an object with respect to a particular pose and/or size of a container, etc.

An augmented reality engine 1114 of a remote computing device 1110 may perform a variety of functions. For example, augmented reality engine 1114 may include functionality capable of producing a camera environment to show on the display 1112 that includes a container and a representation of an object within the container. Augmented reality engine 1114 may also determine the pose of a container shown within a camera environment (which may be based at least in part on determining the pose of a marker in a captured image and a pose of the remote computing device). In some embodiments, augmented reality engine 1114 is able to determine the location and orientation of a marker with respect to a remote computing device and, based on an orientation and location of that marker, determine the orientation and location of a container with respect to a remote computing device and/or a marker.

Figure 12:
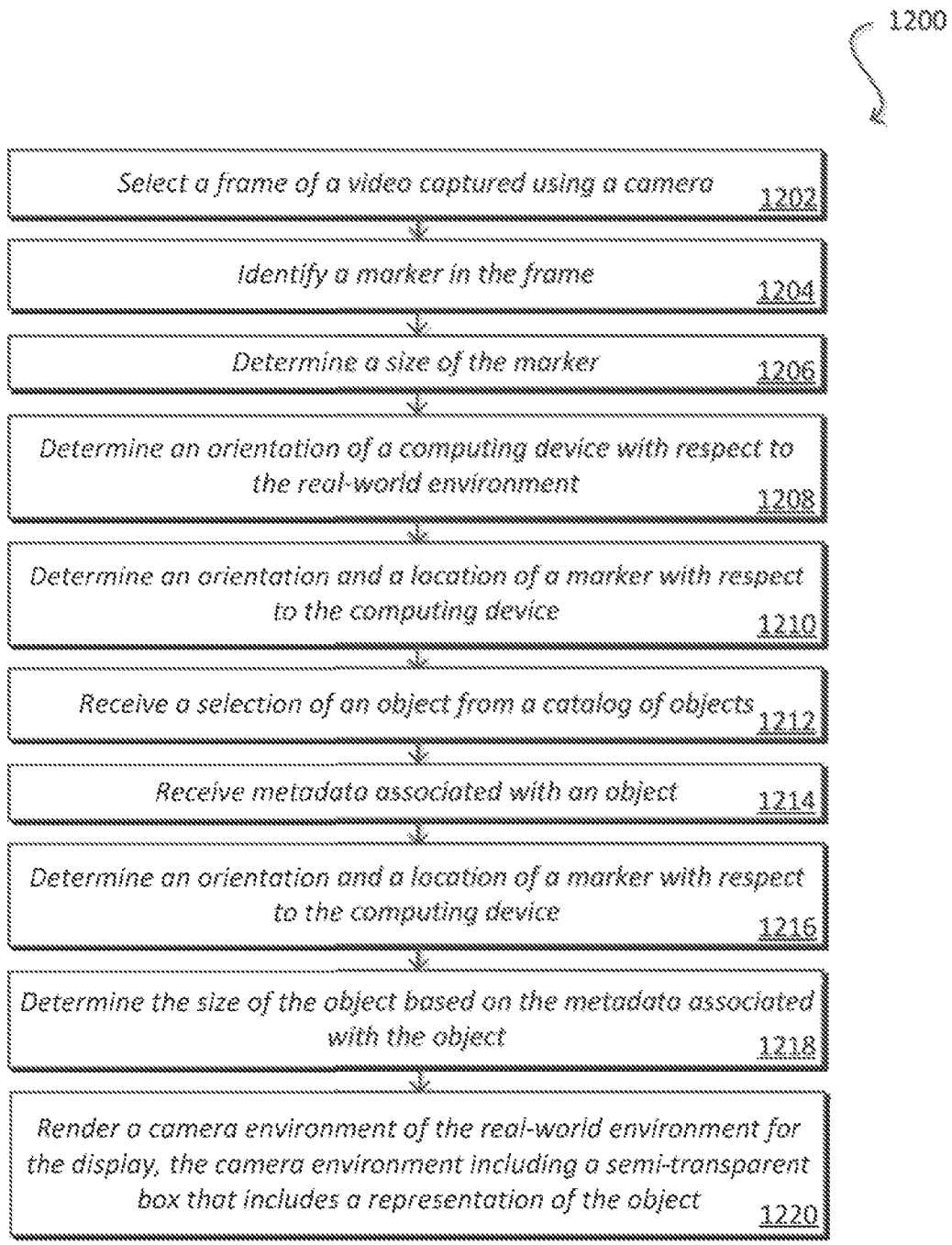
FIG. 12 illustrates an example method for rendering a camera environment, in accordance with at least one embodiment.

FIG. 12 illustrates an example method 1200 for rendering a camera environment, in accordance with various embodiments. It should be understood that there can be additional, fewer, or alternative steps performed in similar or alternative orders, or in parallel, within the scope of the various embodiments unless otherwise stated. The example method 1200 begins at 1202, with selecting a frame of a video captured using a camera. The frame may be of a custom environment such as a user's living room. Of course, an image may be captured by a computing device and used instead of a frame of a video. At 1204, a marker is identified within the frame. The marker may be two-dimensional, and can comprise a pattern, a QR code, a cover of a magazine, a design downloaded and printed onto a piece of paper, a dollar bill, etc.

At step 1206, the size of the marker is determined. The size of the marker assists a computing device with creating a camera environment. Based upon the size of the marker, the computing device may know how large to make the container. At 1208, an orientation of a computing device with respect to the real-world environment is determined. For example, the orientation of the computing device with respect to little g may be determined. In some embodiments, a computing device may determine its pose with respect to a real-world environment based at least in part on components included in the computing device such as a stereoscopic camera, 3D scanner, infrared, etc. At 1210, an orientation and location of a marker is determined with respect to a computing device. Based on this pose (i.e., orientation and location), a container may be placed in a camera environment, in various embodiments. For example, the pose of a container in a camera environment may be based at least in part on the viewing angle and relative location of a marker located in a real-world environment.

At 1212, a selection of an object is received from a catalog of objects. The object may include one or more products from an online retailer or a consumer-to-consumer service. The catalog may include a variety of objects, including furniture, appliances, consumer products, commercial equipment, etc. At 1214, metadata associated with an object is received. As described above, metadata associated with an object may include, but is not limited to: an object's size, an object's dimensions, representations of an object, representations of an object to be shown in a camera environment based on the pose of a container, a vector or matrix, an indicator of the bottom of the container (which may be utilized with the little g determined by a computing device to determine an orientation of a container), an object's ID, an object's product page, etc. At 1216, an orientation and a location of a marker is determined with respect to a computing device. In other words, the pose of a marker with respect to a computing device may be determined. At 1218, the size of an object is determined based on the metadata associated with the object. For example, the size of an object in camera view may be based on the metadata associated with an object, the size and/or location of a marker, and the pose of a computing device. At 1220, a camera environment of the real-world environment is rendered for the display of the computing device. The camera environment may include an at least semi-transparent container that includes a representation of an object.

Figure 13:
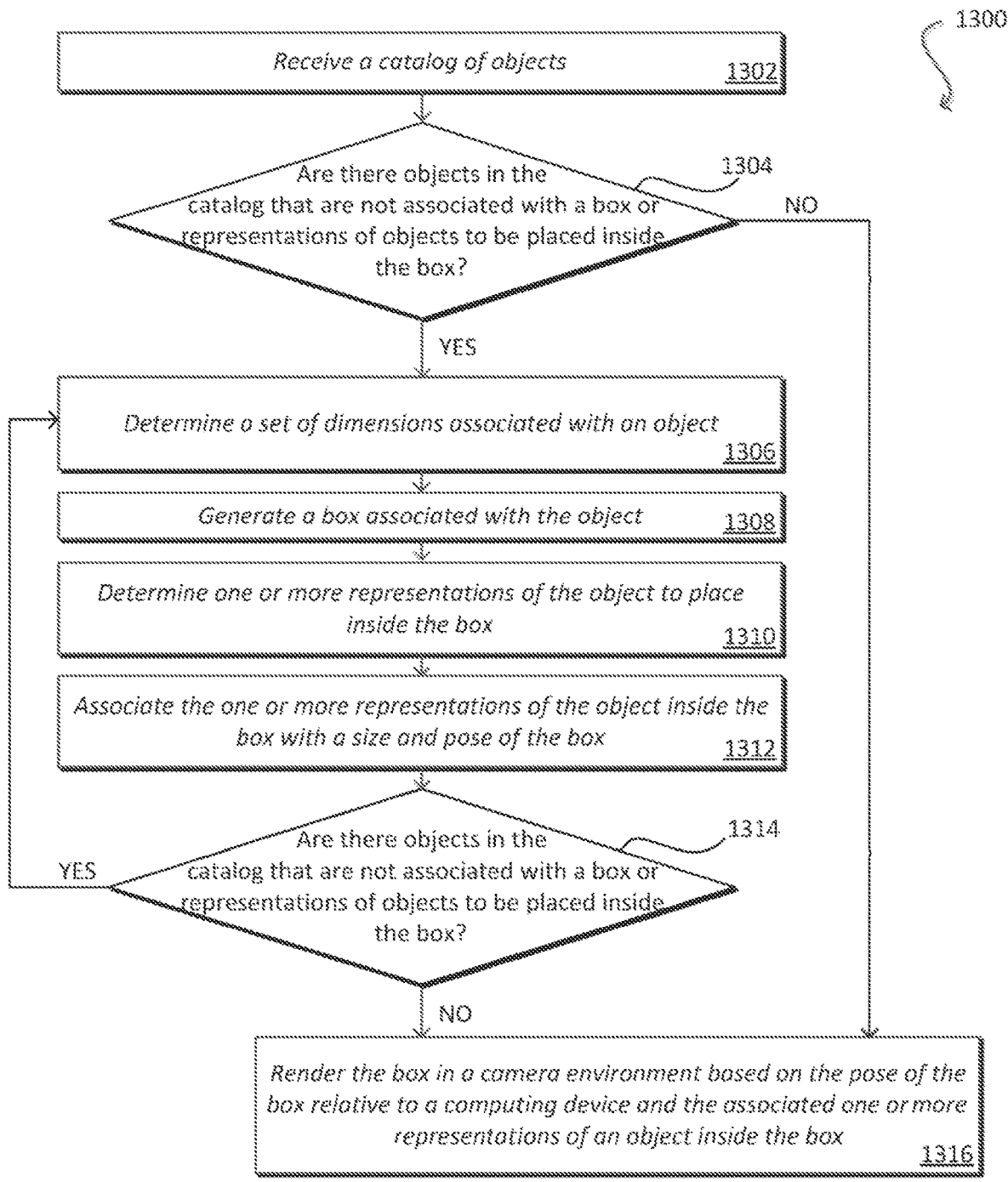
FIG. 13 illustrates an example method for creating virtual containers to place in a camera environment, in accordance with at least one embodiment.

FIG. 13 illustrates an example method 1300 for creating containers to place in a camera environment, in accordance with at least one embodiment. At 1302, a catalog of objects is received. As discussed, a catalog may be stored in a database. This catalog may be received by a server, multi-tenant environment, etc., such that the containers and representations of objects within containers may be determined at a remote location from the user and their computing device prior to displaying the containers in a camera environment. At 1304, a determination is made as to whether there are objects in the catalog that are not associated with a container or representations of one or more objects to be placed inside the container. If there are not any objects without associated containers or representations of objects, the example method advances to 1316 where a container is rendered in a camera environment based on the pose of the container relative to a computing device and the associated one or more representations of an object inside the container. However, if there are additional objects in the catalog that are not associated with a container or a representation of an object, the method advances to 1306. It should be understood that in various embodiments, an associated container is a container with dimensions based at least in part on the dimensions of an object. Further, representations of objects in a container may include a variety of different types of representations and associated viewpoints/vectors/matrices.

At 1306, a set of dimensions is associated with an object. The set of dimensions may be based upon metadata associated with an object, which may have been entered by a user, or the dimensions may have been determined by a scanner or other three-dimensional object capturing device. At 1308, a container associated with the object is generated. For example, a container may be generated based upon the dimensions of the object. Moreover, a container may have associated labels with each surface of the container. For example, the container may have a surface that is configured to be on, or parallel to, a plane that a marker is on. In some embodiments, a container may have a surface that is associated with a direction such as down, for instance. In such a case, a computing device may determine little g and display a container in camera view such that a container is oriented such that the down surface of the container faces toward the direction of the force created by little g. At 1310, one or more representations of the object to place inside the container are determined. As discussed above, for example, the one or more representations of an object to place inside a container may be based at least in part on the images of an object uploaded by a user such as a retailer. In some embodiments, the representation of an object may be a single icon, which appears in a camera environment inside a container, such that it is always facing straight ahead toward the display in a camera environment. At 1312, one or more representations of an object inside a container may be associated with a size and pose of a container. As described above, an orientation of an object inside a container may be predetermined with respect to the angle at which a container is being viewed. Similarly, the representation of an object may be based on the dimensions of a container, and may also be determined prior to generating a camera view of an environment. At 1314, a determination is made as to where there are objects in the catalog that are not associated with a container or representations of objects to be placed inside a container. As with step 1304, if there are no objects in the catalog left that are not associated with a container or a representation of an object in a container, for example, the method may advance to step 1316 and render a camera view of a scene, a container, and a representation of an object inside the container. However if there are objects in a catalog that are not associated with a container or a representation of an object inside a container, the method returns to step 1306 to associate a container and/or a representation of an object to be placed inside a container.

Figure 14:
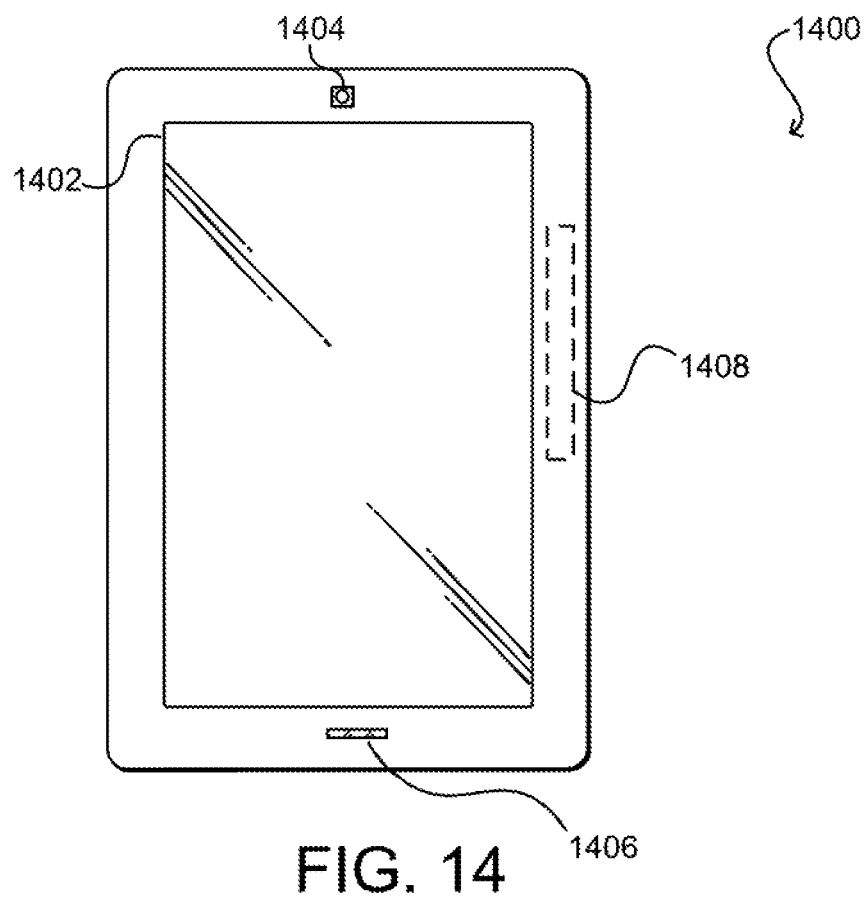
FIG. 14 illustrates an example an example device that can be used to implement aspects of the various embodiments, in accordance with at least one embodiment.

FIG. 14 illustrates an example electronic user device 1400 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 1400 has a display screen 1402 on the front side, which under normal operation will display information to a user facing the display screen (e.g., on the same side of the computing device as the display screen). The computing device in this example includes at least one camera 1404 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1400 also includes at least one microphone 1406 or other audio capture device capable of capturing audio data, such as words or commands spoken by a user of the device. In this example, a microphone 1406 is placed on the same side of the device as the display screen 1402, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1400 also includes at least one orientation sensor 1408, such as a position and/or movement-determining element. An orientation sensor may be used to determine an angle of a plane associated with a two-dimensional marker with respect to the computing device. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 15:
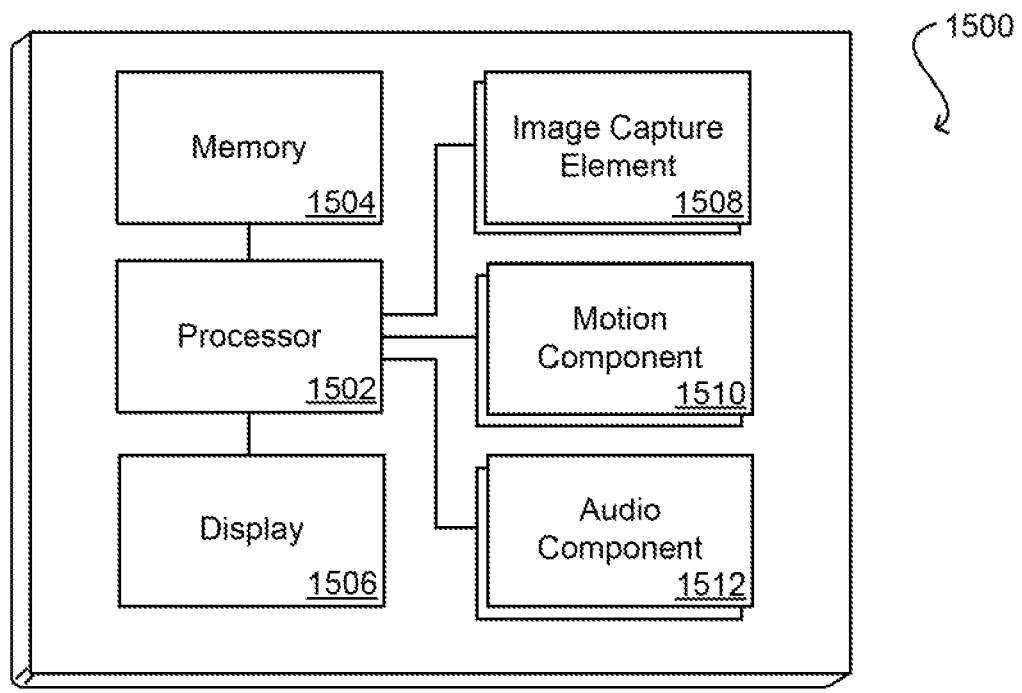
FIG. 15 illustrates example components of a client device such as that illustrated in FIG. 14, in accordance with at least one embodiment.

FIG. 15 illustrates a logical arrangement of a set of general components of an example computing device 1500 such as the device 1400 described with respect to FIG. 14. In this example, the device includes a processor 1502 for executing instructions that can be stored in a memory device or element 1504. As would be apparent to one of ordinary skill in the art, the device can include many types of memory, data storage, or non-transitory computer-readable storage media, such as a first data storage for program instructions for execution by the processor 1502, a separate storage for images or data, a removable memory for sharing information with other devices, etc. The device typically will include some type of display element 1506, such as a touch screen or liquid crystal display (LCD), although devices such as portable media players might convey information via other means, such as through audio speakers. As discussed, the device in many embodiments will include at least one image capture element 1508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1512, such as a mono or stereo microphone or microphone array, operable to capture audio information from at least one primary direction. A microphone can be a uni-directional or omni-directional microphone as known for such devices.

In some embodiments, the computing device 1500 of FIG. 15 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1500 also can include at least one orientation or motion sensor 1510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1502, whereby the device can perform any of a number of actions described or suggested herein.

As an example, a computing device such as that described with respect to FIG. 14 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed above, the various embodiments can be implemented in a wide variety of operating environments, which in some cases can include one or more user computers, computing devices, or processing devices which can be used to operate any of a number of applications. User or computing devices can include any of a number of general purpose personal computers such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a camera;
   a depth sensor;
   a display screen; and
   memory including instructions that, when executed by the at least one processor, cause the computing device to:
      obtain image data of a physical environment using the camera;
      obtain depth data of the physical environment using the depth sensor;
      receive a user selection, provided through the computing device, for a set of dimensions;
      display, on the display screen in an interface, the image data and a virtual container, the virtual container displayed according to a pose with respect to the computing device and the set of dimensions;
      determine, using the depth data of the physical environment, a separation between the virtual container and an object located in the physical environment that is represented in the interface; and
      provide a listing of items, individual items of the listing of items being associated with a respective set of dimensions indicating that the respective item can fit within a volume determined by the set of dimensions.

2. The computing device of claim 1, wherein the depth sensor comprises a stereoscopic sensor or an infrared sensor.

3. The computing device of claim 1, wherein the virtual container is semi-transparent container.

4. The computing device of claim 1, wherein the instructions, when executed further cause the computing device to:
   receive a selection of an item in the listing of items; and
   display a representation of the item in the virtual container.

5. The computing device of claim 1, wherein the instructions, when executed by the processor, further enable the computing device to:
   receive a selection on the interface corresponding to an area of the physical environment; and
   display the virtual container with a pose corresponding to the area of the physical environment.

6. The computing device of claim 5, wherein the instructions, when executed further cause the computing device to:
   receive a selection on the interface corresponding to an orientation of the virtual container; and
   display the virtual container with a pose corresponding to the orientation.

7. The computing device of claim 1, wherein the selection includes one of a touch-based input on the interface or a selection of one of a plurality of identified areas of the physical environment represented on the interface.

8. The computing device of claim 1, wherein the instructions, when executed further cause the computing device to:
   submit a search query that includes at a search term and the set of dimensions, wherein the listing of items are the result of the search query.

9. The computing device of claim 1, wherein the interface includes a control interface to modify dimensions of the virtual container, and wherein the instructions, when executed further cause the computing device to:
   receive a selection for a modified set of dimensions for the virtual container;
   display the virtual container according to the modified set of dimensions; and
   provide an updated listing of items wherein each item of the listing of items is associated with a respective set of dimensions indicating that the respective item can fit within a volume determined by the modified set of dimensions.

10. A computer-implemented method, comprising:
    obtaining image data of a physical environment;
    obtaining depth data of the physical environment;
    receive a selection for a set of dimensions;
    displaying, on a display screen of a computing device in an interface, the image data and a virtual container, the virtual container displayed according to a pose with respect to the computing device and the set of dimensions;
    determining, using the depth data of the physical environment, a separation between the virtual container and an object located in the physical environment that is represented in the interface; and
    providing a listing of items, individual items of the listing of items associated with a respective set of dimensions indicating that the respective item can fit within a volume determined by the set of dimensions.

11. The computer-implemented method of claim 10, wherein the image data is captured with a camera of the computing device and wherein the depth data is captured using a depth sensor of the computing device.

12. The computer-implemented method of claim 10, wherein the image data is captured with a camera of a second computing device and wherein the depth data is captured using a depth sensor of second computing device.

13. The computer-implemented method of claim 10, further comprising: receiving a selection of an item in the listing of items; and
    displaying a representation of the item in the virtual container.

14. The computer-implemented method of claim 10, further comprising:
    receiving a selection on the interface corresponding to an area of the physical environment, wherein the pose of the virtual container displayed corresponds to the area of the physical environment.

15. The computer-implemented method of claim 14, further comprising
    determining spatial information for the object in the physical environment; and
    determining, based at least in part on the spatial information, an orientation for the pose which the virtual container is displayed.

16. The computer-implemented method of claim 10, wherein the virtual container is provided for display at substantially the same time that the image data and depth data is obtained.

17. A computing system comprising:
- at least one processor;
- memory including instructions that, when executed by the at least one processor, cause the computing system to:
- obtain image data of a physical environment using a camera of a computing device;
- obtain depth data of the physical environment using a depth sensor of the computing device;
- receive a user selection, provided through the computing device, for a set of dimensions;
- cause to be displayed, on a display screen of the computing device in an interface, the image data and a virtual container, the virtual container displayed according to a pose with respect to the computing device and the set of dimensions;
- determine, using the depth data of the physical environment, a separation between the virtual container and an object located in the physical environment that is represented in the interface; and
- provide a listing of items, individual items of the listing of items associated with a respective set of dimensions indicating that the respective item can fit within a volume determined by the set of dimensions.

18. The computer-implemented method of claim 17, wherein the instructions when executed by the at least one processor further cause the computing system to:
- receive a selection of an item in the listing of items; and
- display a representation of the item in the virtual container.

19. The computer-implemented method of claim 17, wherein the instructions when executed by the at least one processor further cause the computing system to:
- receive a selection on the interface corresponding to an area of the physical environment, wherein the pose of the virtual container displayed corresponds to the area of the physical environment.

20. The computer-implemented method of claim 17, wherein the instructions when executed by the at least one processor further cause the computing system to:
- determine spatial information for the object in the physical environment, and
- determine, based at least in part on the spatial information, an orientation for the pose which the virtual container is displayed.

* * * * *